US012527767B2

(12) United States Patent
Mohan

(10) Patent No.: US 12,527,767 B2
(45) Date of Patent: Jan. 20, 2026

(54) EYE DROPS TO TREAT CHEMICALLY INDUCED CORNEAL DAMAGE

(71) Applicants: The Curators of the University of Missouri, Columbia, MO (US); The United States Government as Represented by the Department of Veterans Affairs, Washington, DC (US)

(72) Inventor: Rajiv R. Mohan, Columbia, MO (US)

(73) Assignees: THE CURATORS OF THE UNIVERSITY OF MISSOURI, Columbia, MO (US); THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 0 days.

(21) Appl. No.: 18/390,829

(22) Filed: Dec. 20, 2023

(65) Prior Publication Data
US 2024/0156783 A1    May 16, 2024

Related U.S. Application Data

(62) Division of application No. 17/090,044, filed on Nov. 5, 2020, now abandoned.

(60) Provisional application No. 62/930,811, filed on Nov. 5, 2019.

(51) Int. Cl.
| | | |
|---|---|---|
| *A61K 31/407* | (2006.01) | |
| *A61K 9/00* | (2006.01) | |
| *A61K 31/167* | (2006.01) | |
| *A61K 31/375* | (2006.01) | |
| *A61K 31/401* | (2006.01) | |
| *A61P 27/02* | (2006.01) | |
| *A61P 29/00* | (2006.01) | |

(52) U.S. Cl.
CPC .......... *A61K 31/407* (2013.01); *A61K 9/0048* (2013.01); *A61K 31/167* (2013.01); *A61K 31/375* (2013.01); *A61K 31/401* (2013.01); *A61P 29/00* (2018.01)

(58) Field of Classification Search
CPC .. A61K 31/407; A61K 31/375; A61K 31/401; A61K 31/167; A61P 27/02
See application file for complete search history.

(56) References Cited

U.S. PATENT DOCUMENTS

| | | | |
|---|---|---|---|
| 7,618,616 B2 | 11/2009 | Barness et al. | |
| 9,763,968 B2 | 9/2017 | Sinko et al. | |
| 2007/0072793 A1* | 3/2007 | Chung | A61K 38/12 514/8.5 |
| 2007/0078083 A1 | 4/2007 | Barlow et al. | |
| 2008/0004311 A1* | 1/2008 | Hellberg | A61K 31/00 514/408 |
| 2009/0048153 A1 | 2/2009 | Varma et al. | |
| 2009/0275099 A1 | 11/2009 | Glick | |
| 2019/0240336 A1 | 8/2019 | Prausnitz et al. | |

FOREIGN PATENT DOCUMENTS

| | | |
|---|---|---|
| WO | 03/077905 A1 | 9/2003 |
| WO | WO-2011127196 A1 * 10/2011 | ........... A61K 31/407 |

OTHER PUBLICATIONS

Li et al (Mol Pharmaceutics, 2013; 10:307-318) (Year: 2013).*
Sharma et al (Molecular Vision, 2010; 16:720-728) (Year: 2010).*
Wagner, et al., "Evaluation of selective and non-selective cyclooxygenase inhibitors on sulfur mustard-induced pro-inflammatory cytokine formation in normal human epidermal keratinocytes", Toxicology Letters, vol. 312, Sep. 15, 2019, pp. 109-117 (9 pgs).
Kadar, et al., "Ocular injuries following sulfur mustard exposure—Pathological mechanism and potential therapy", Toxicology, vol. 263, Issue 1, Sep. 1, 2009, pp. 59-69 (11 pgs).
Venosa, et al., "Regulation of Nitrogen Mustard-Induced Lung Macrophage Activation by Valproic Acid, a Histone Deacetylase Inhibitor", Toxicological Sciences, vol. 157, No. 1, 2017, pp. 222-234 (13 pgs).
Naghii, "Sulfur Mustard Intoxication, Oxidative Stress, and Antioxidants", Military Medicine, Vo. 167, Jul. 2002, pp. 573-575 (4 pgs).
Amir et al., "Beneficial effects of topical anti-inflammatory drugs against sulfur mustard-induced ocular lesions in rabbits", J Appl Toxicol 20, S109-S114, Dec. 2001 (6 pgs).
Williams, et al., "Inhibition of the acute ocular responses to nitrogen mustard by colchicine", Experimental Eye Research, vol. 39, Issue 6, Dec. 1984, pp. 721-729 (10 pgs).
Dachir, "Amelioration of sulfur mustard skin injury following a topical treatment with a mixture of a steroid and a NSAID", Journal of Applied Toxicology, 24(2): 107-113, Feb. 29, 2004 (7 pgs).
Loftsson, Thorsteinn et al., Enalaprilat and enalapril maleate eyedrops lower intraocular pressure in rabbits, Acta Ophthalmologica 88, pp. 337-341 (2010).
Allergan (ACULAR Prescribing Information, Allergen, Inc. 2012) (Year 2012), 7 pages.

* cited by examiner

*Primary Examiner* — Rayna Rodriguez
(74) *Attorney, Agent, or Firm* — Stinson LLP

(57) ABSTRACT

Provided herein are compositions suitable for treating chemically induced eye damage comprising (a) a nonsteroidal anti-inflammatory drug (NSAID), (b) a histone deacetylase (HDAC) inhibitor and (c) an angiotensin converting enzyme (ACE) inhibitor and, optionally, (d) a water-soluble vitamin. Methods of using provided compositions to treat ocular toxicity and corneal damage following exposure to chemical agents (e.g., mustard gas) are also provided.

19 Claims, 17 Drawing Sheets
(8 of 17 Drawing Sheet(s) Filed in Color)

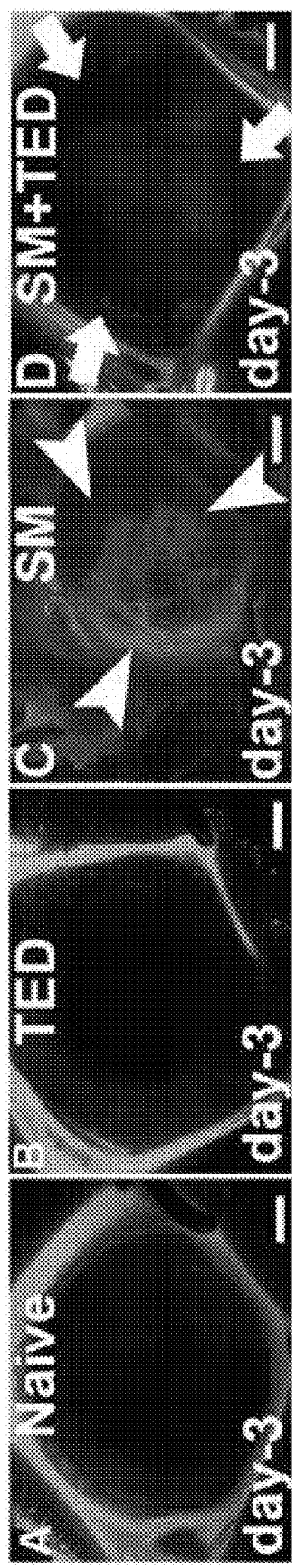
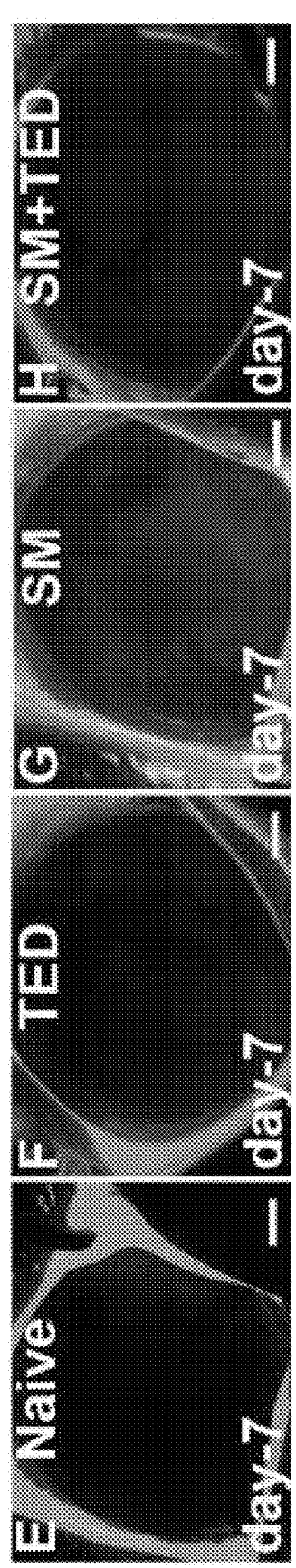
FIG. 1A  FIG. 1B  FIG. 1C  FIG. 1D
FIG. 1E  FIG. 1F  FIG. 1G  FIG. 1H

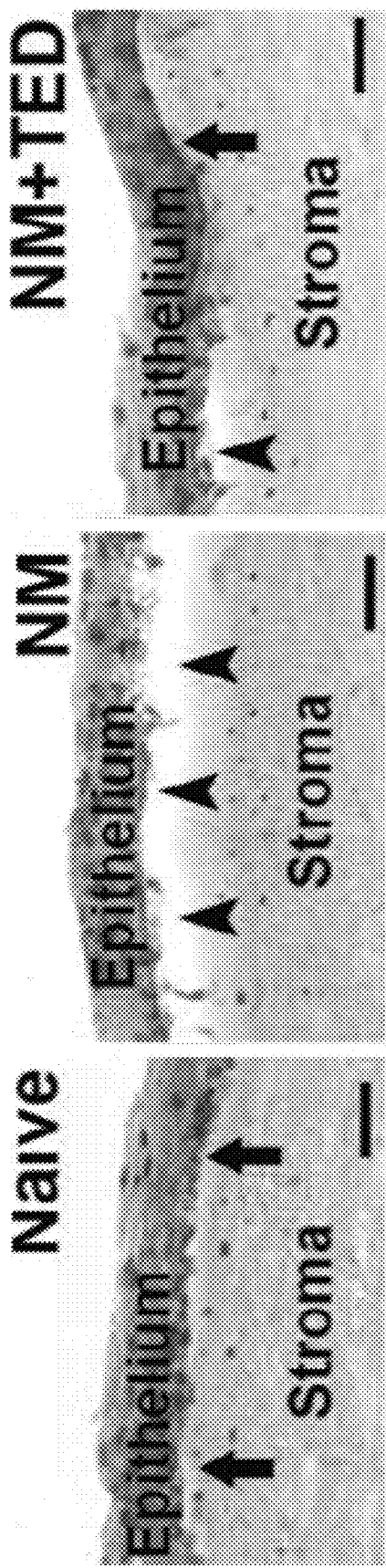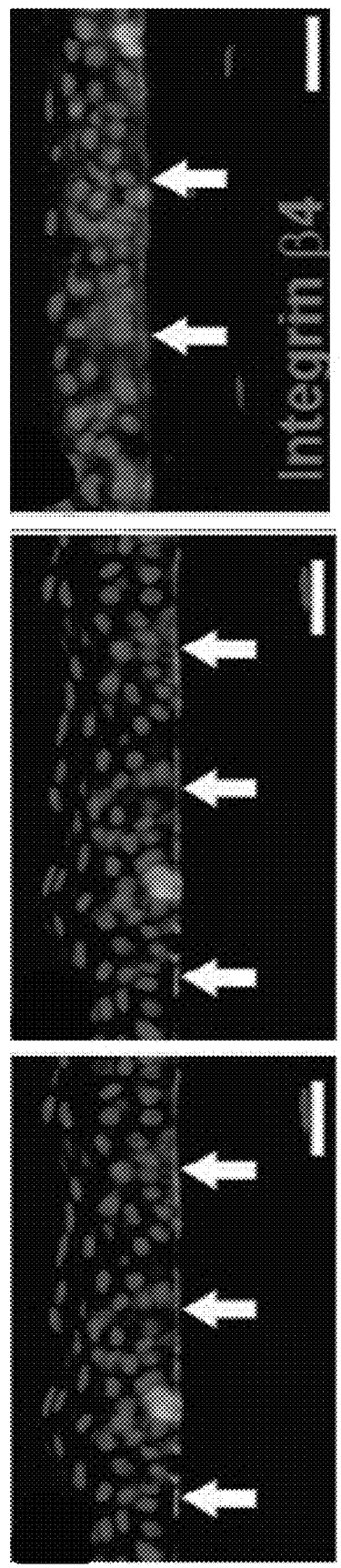
FIG. 3A  FIG. 3B  FIG. 3C
FIG. 3D  FIG. 3E  FIG. 3F

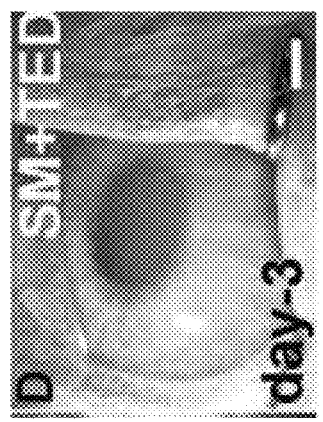
FIG. 5A
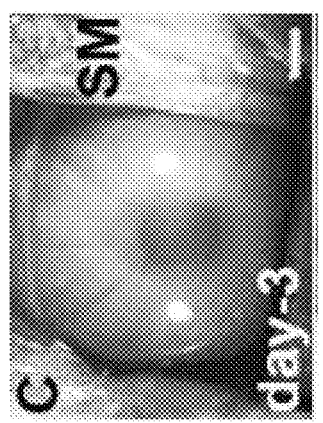
FIG. 5B
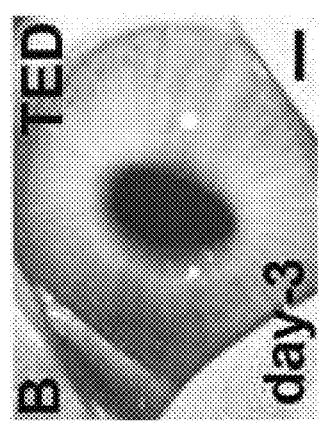
FIG. 5C
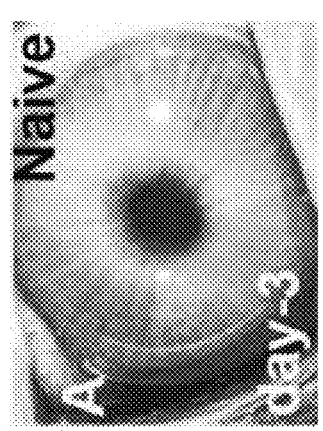
FIG. 5D
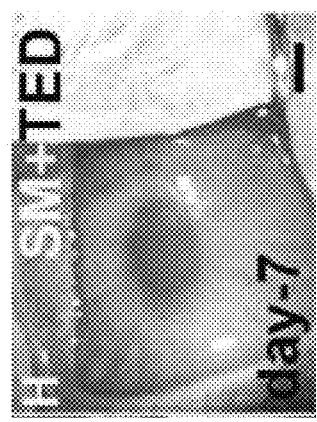
FIG. 5E
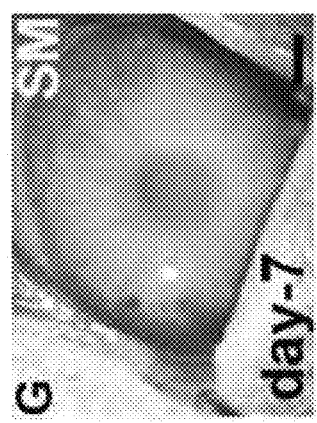
FIG. 5F
FIG. 5G
FIG. 5H
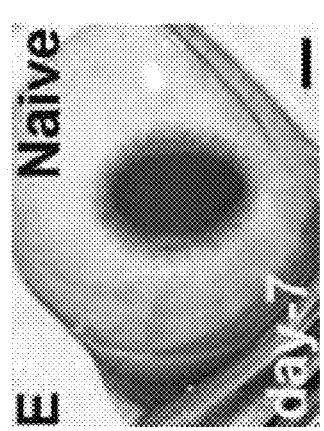
FIG. 5I
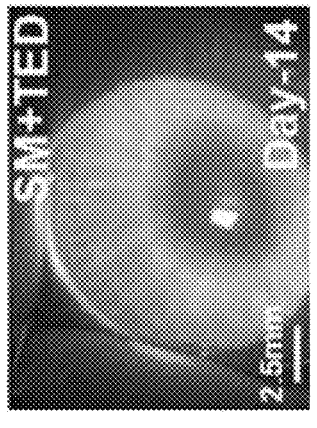
FIG. 5J
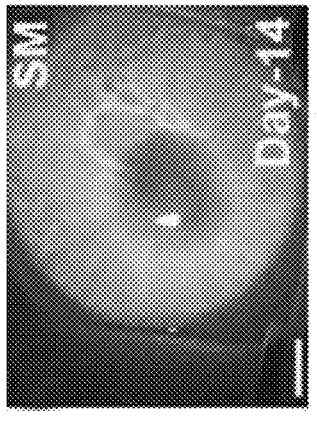
FIG. 5K
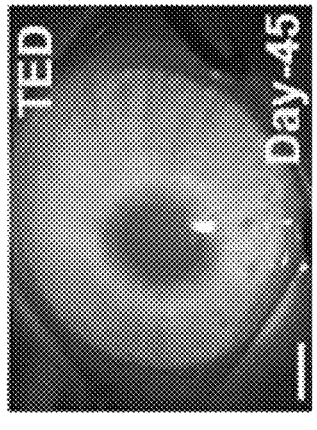
FIG. 5L
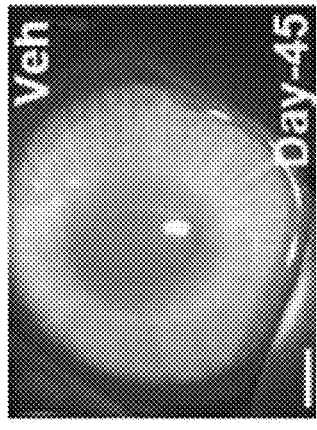

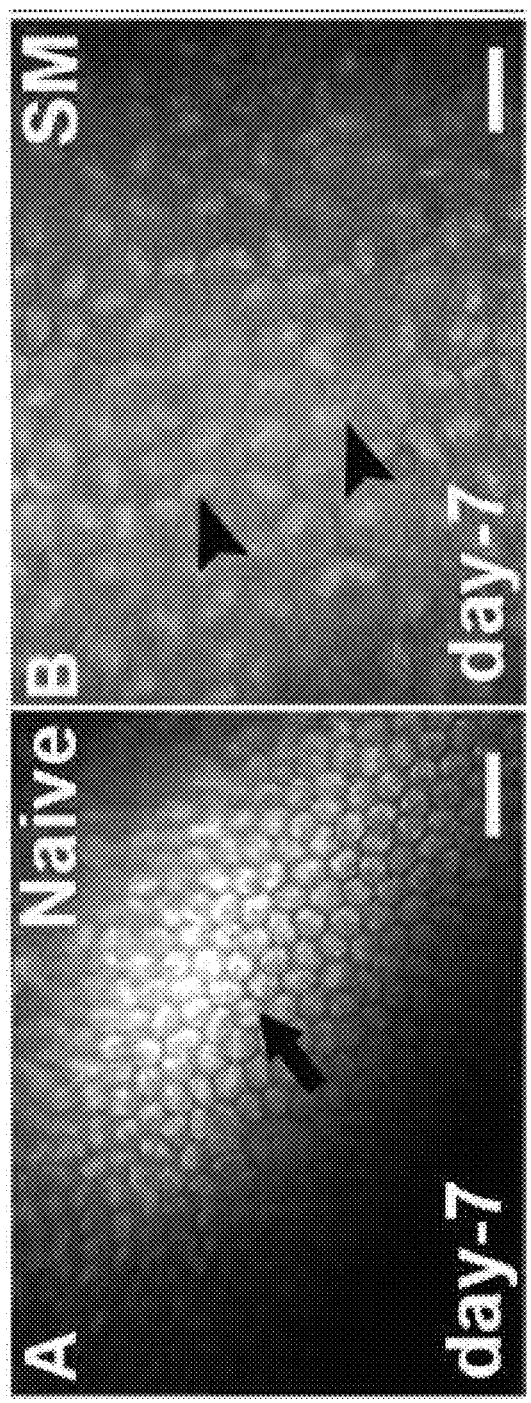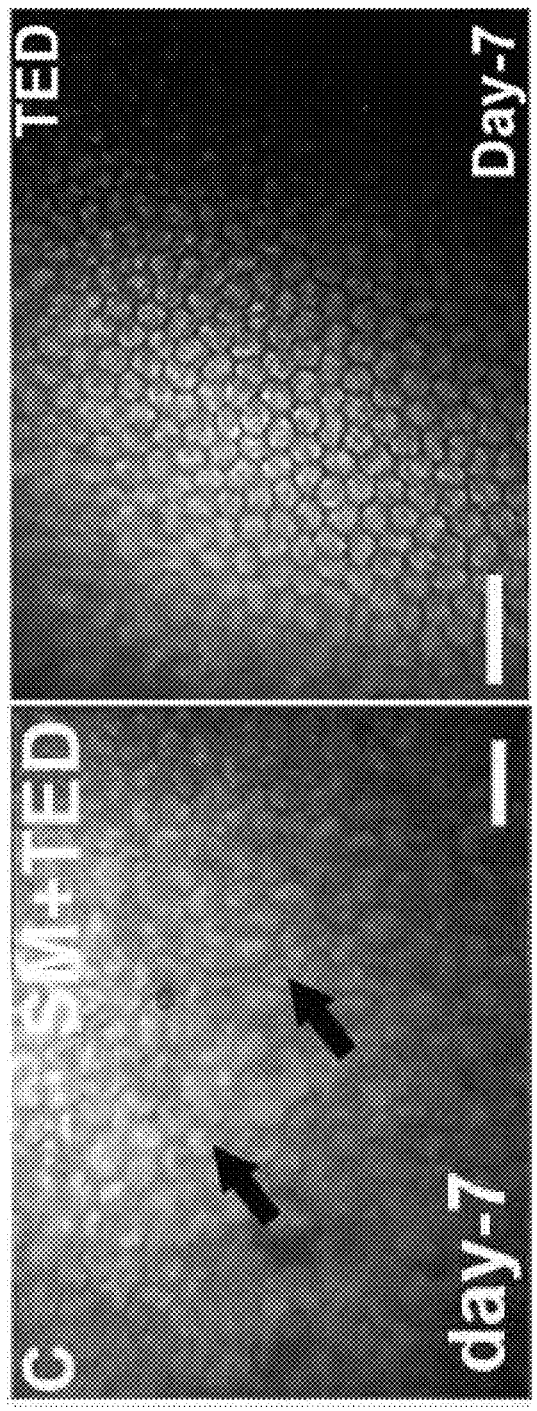
FIG. 9A  FIG. 9B  FIG. 9C  FIG. 9D

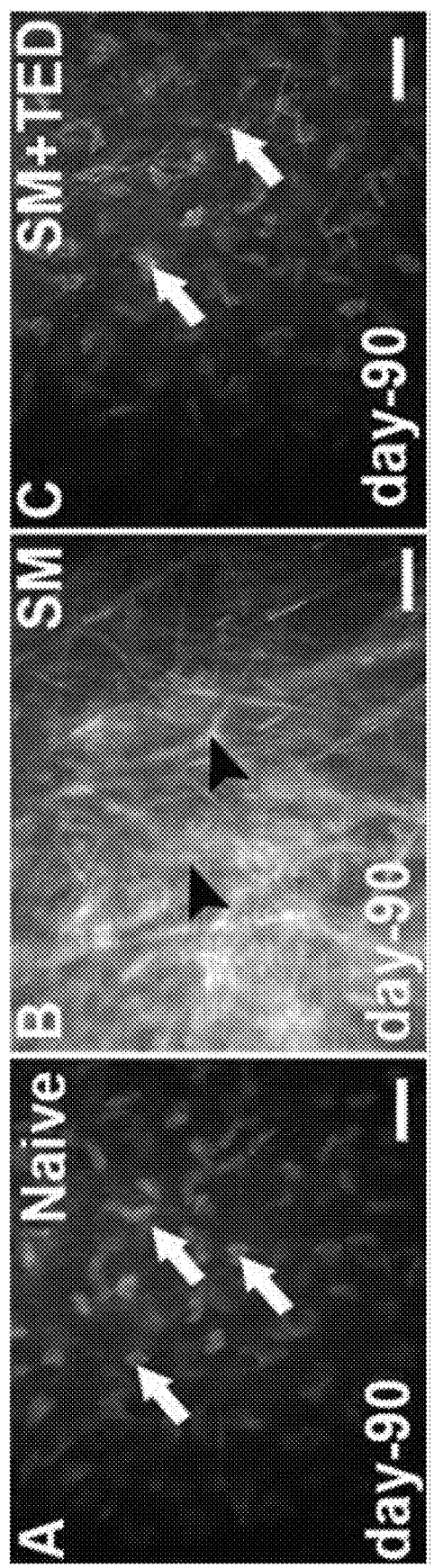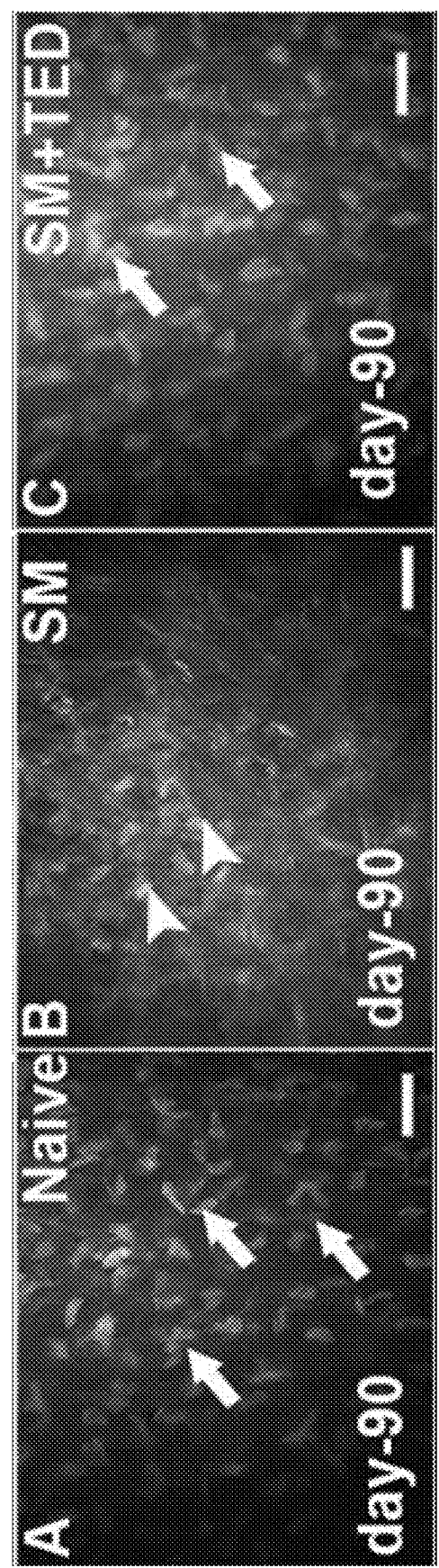
FIG. 12A  FIG. 12B  FIG. 12C
FIG. 13A  FIG. 13B  FIG. 13C

EYE DROPS TO TREAT CHEMICALLY INDUCED CORNEAL DAMAGE

CROSS REFERENCE TO RELATED APPLICATIONS

This application claims priority to U.S. Nonprovisional Patent Application No. 17/090,044 filed Nov. 5, 2020, which claims priority to U.S. Provisional Application No. 62/930,811 filed Nov. 5, 2019, which is incorporated herein by reference in its entirety.

STATEMENT REGARDING FEDERALLY SPONSORED RESEARCH OR DEVELOPMENT

This invention was made with Government support under grant number U01EY031650 and R21EY030234 awarded by the National Institutes of Health. The government has certain rights in the invention.

FIELD OF THE INVENTION

The present invention relates to a pharmaceutical composition for treating chemically induced corneal damage and methods of use thereof.

BACKGROUND OF THE INVENTION

Sulfur mustard gas (SM), a vesicating warfare agent, has been used in many wars since World War I including Iran-Iraq and most recently in Syria. SM exposure causes severe corneal injury, pain, and irreversible blindness. The cornea provides ⅔rd of the eye's refraction, and is vital for vision. SM, an alkylating agent, on contact to the eye rapidly penetrates into the cornea and causes a grade-3 or 4 clinical pathology called mustard gas keratopathy (MGK), which involves ocular inflammation, and loss of epithelial barrier, recurrent epithelial erosions, epithelial-stromal separation, haze/fibrosis, and neovascularization in the cornea. MGK leads to corneal collapse, with biphasic, acute and delayed-onset, manifestations involving multiple mechanisms. Despite a high risk of SM being used for terrorism, no therapy currently exists to counter SM's toxicity to the eye.

Accordingly, a therapy for effectively treating and mitigating chemical toxicity in the cornea is needed. Such a therapy should be easy to administer, have no off-target effects, and show effectiveness against both acute chemical toxicity and delayed toxicity induced by mustard gas exposure.

BRIEF SUMMARY OF THE INVENTION

Provided herein are compositions comprising (a) a non-steroidal anti-inflammatory drug (NSAID); (b) a histone deacetylase (HDAC) inhibitor; and (c) an angiotensin converting enzyme (ACE) inhibitor.

Also provided are methods of treating corneal damage and/or ocular toxicity in a subject in need thereof, the methods comprising administering to an eye of the subject any composition described herein.

Other objects and features will be in part apparent and in part pointed out hereinafter.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 1A is a fluorescein eye test images of a naïve rabbit eye showing no epithelial defects at day-3.

FIG. 1B is a fluorescein eye test image of a rabbit eye treated with TED-alone, showing no epithelial defects at day-3.

FIG. 1C is a fluorescein eye test image of an SM-exposed rabbit eye showing severe corneal epithelial erosion by day-3 (arrowhead).

FIG. 1D is a fluorescein eye test image of an SM-exposed rabbit eye treated with TED showing a rescue of corneal epithelial erosion at day 3 (arrows).

FIG. 1E is a fluorescein eye test image of a naïve rabbit eye showing no epithelial defects at day-7.

FIG. 1F is a fluorescein eye test image of a rabbit eye treated with TED-alone showing no epithelial defects at day-7.

FIG. 1G is a fluorescein eye test image of an SM-exposed rabbit eye showing a diffuse green stain indicating healing of SM-induced epithelial defects by 7 days.

FIG. 1H is a fluorescein eye test image of an SM-exposed rabbit eye treated with TED continuing to show no epithelial defects at day 7.

FIG. 3A is an H&E staining of a vehicle-treated cornea showing normal anatomical features.

FIG. 3B is an H&E stain of an NM injured human cornea showing acute MGK as shown by the disrupted epithelial-stromal organization and detached basement membrane.

FIG. 3C is an H&E stain of an NM exposed human cornea treated with TED showing restored epithelial stromal organization.

FIG. 3D is an integrin (34 stain showing normal corneal anatomical features in a vehicle treated cornea.

FIG. 3E is an integrin (34 stain showing injured epithelial-stromal organization and basement membrane in acute MGK induced by NM exposure to human cornea.

FIG. 3F is an integrin (34 stain of an NM exposed human cornea treated with TED showing restored epithelial stromal organization.

FIG. 5A is a slit-lamp microscopy image in a live, naïve rabbit eye showing normal ocular health with no corneal opacity or injury at day 3.

FIG. 5B is a slit-lamp microscopy image in a TED-alone treated rabbit eye showing normal ocular heath with no corneal opacity or injury at day 3.

FIG. 5C is a slit-lamp microscopy image of a SM-exposed rabbit eye showing increased corneal haze at day 3.

FIG. 5D is a slit-lamp microscopy image of an SM-exposed rabbit eye treated with TED showing reduced corneal haze at day 3.

FIG. 5E is a slit-lamp microscopy image of a naïve rabbit eye showing normal ocular health with no corneal opacity or injury at day 7.

FIG. 5F is a slit-lamp microscopy image of a TED-alone treated rabbit eye showing normal ocular health with no corneal opacity or injury at day 7.

FIG. 5G is a slit-lamp microscopy image of a SM-exposed rabbit eye showing increased corneal haze at day 7.

FIG. 5H is a slit-lamp microscopy image of an SM-exposed rabbit eye treated with TED showing reduced corneal haze at day 7.

FIG. 5I is a slit-lamp microscopy image of a naïve rabbit eye showing normal ocular health with no corneal opacity or injury at day 45.

FIG. 5J is a slit-lamp microscopy image of a TED-alone treated rabbit eye showing normal ocular health with no corneal opacity or injury at day 45.

FIG. 5K is a slit-lamp microscopy image of a SM-exposed rabbit eye showing increased corneal haze at day 14.

FIG. 5L is a slit-lamp microscopy image of an SM-exposed rabbit eye treated with TED showing reduced corneal haze at day 14.

FIG. 9A is a confocal microscopy image of corneal endothelial cells in live naïve rabbits.

FIG. 9B is a confocal microscopy image of corneal endothelial cells in live rabbits exposed to SM showing loss of cell-count, poor hydration, irregular shape, and edema.

FIG. 9C is a confocal microscopy image of corneal endothelial cells in live rabbits exposed to SM and treated with TED.

FIG. 9D is a confocal microscopy image of corneal endothelial cells in live rabbits treated with TED alone.

FIG. 12A shows confocal imaging of normal anterior stroma found in naïve rabbit.

FIG. 12B shows confocal imaging of anterior stroma following SM exposure that led to transparency loss, highlight reflectivity, & haze.

FIG. 12C shows confocal imaging of anterior stroma in eyes treated with TED following SM exposure. TED administration rescued blinding conditions in 80% rabbit eyes in vivo (arrow).

FIG. 13A shows confocal imaging of normal posterior stroma in naïve rabbit eyes.

FIG. 13B shows confocal imaging of posterior stroma in eyes exposed to SM and indicates signs of transparency-loss, light-reflectivity, & haze were present, albeit reduced compared to anterior stroma (e.g., FIG. 12B).

FIG. 13C shows confocal imaging of posterior stroma in eyes exposed to SM and treated with TED. TED reduces SM-injury in posterior stroma (arrow).

Corresponding reference characters indicate corresponding parts throughout the drawings.

DETAILED DESCRIPTION OF THE INVENTION

Figures 2A, 2B:
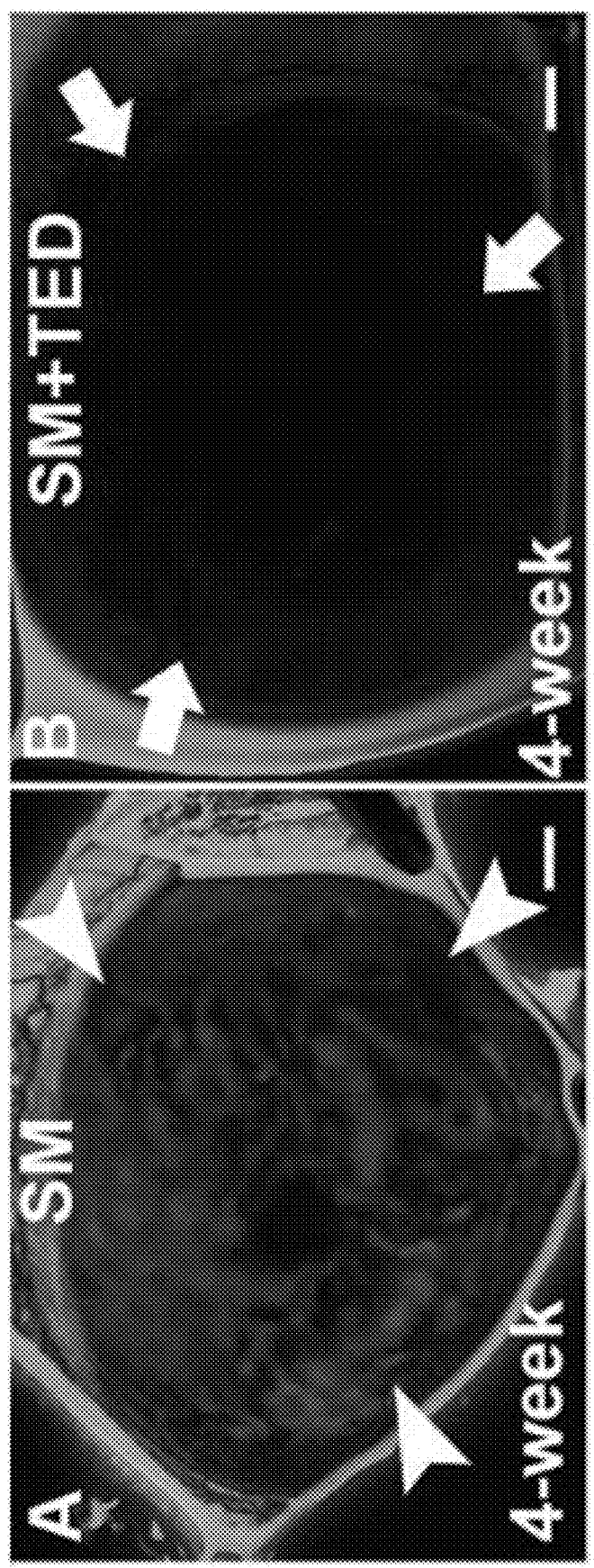
FIG. 2A is a fluorescein eye test image showing recurrence of corneal epithelial erosion in SM-exposed rabbit eyes at 1-month (arrowheads).
FIG. 2B is a fluorescein eye test image showing no recurrence of corneal epithelial erosion in SM-exposed eyes treated with TED after 1-month (arrowheads).

Provided herein is a composition comprising (a) a non-steroidal anti-inflammatory drug (NSAID), (b) a histone deacetylase (HDAC) inhibitor and (c) an angiotensin converting enzyme (ACE) inhibitor. The composition can be prepared as a multimodal non-steroidal topical ophthalmic formulation, effective at stopping corneal damage and vision loss induced by exposure to chemical agents (e.g., sulfur mustard gas). Advantageously, the composition is also stable at ambient temperature, has a long shelf-life, is easy to use, and is cost-effective. Thus, it can be suitable for use during accidental or intentional SM exposure.

Each of the components in the composition provide unique benefits to alleviate symptoms induced by mustard gas exposure.

NSAIDs block COX enzymes and inhibit ocular pain, inflammation, burning, and stinging in eye. Certain NSAIDs are included in eye drops to treat post-surgical pain.

Accordingly, in various embodiments, the composition comprises an NSAID. The NSAID can be selected from the group consisting of diclofenac sodium, flubiprofen sodium, ketorolac, bromfenac, nepafenac, and any combination thereof. For example, the NSAID can comprise ketorolac.

In various embodiments, the composition can comprise from about 0.1% to about 5%, from about 0.1% to about 4%, from about 0.1% to about 3%, from about 0.1% to about 2%, or from about 0.1% to about 2% by weight or volume of the NSAID. For example, the composition can comprise about 0.5% by weight or volume of the NSAID.

HDAC inhibitors are used clinically in humans to treat cancer. Topical HDACi drops to injured eye can reduce TGFβ-mediated corneal fibrosis in vitro in human and in vivo in rabbit models without toxicity. Further, the HDACi can be an effective and safe alternative to topoisomerase IIB inhibitors like Mitomycin C for treating corneal fibrosis and ocular/conjunctival fibrosis in rabbits in vivo.

In various embodiments, the composition comprises a histone deacytalase inhibitor (HDACi). The HDACi can be selected from the group consisting of vorinostat (suberoylanilide hydroxamic acid, SAHA), trichostatin A (TSA), panobinostat (LBH589), belinostat (PXD101), romidepsin (FK228), entinostat (MS-275), mocetinostat (MGCD0103), valproic acid (VPA), sodium butyrate (NaB), and phenylbutyrate (PBA). The HDACi can inhibit Class I or Class II HDACs. For example, the HDACi can comprise SAHA (suberoylanilide hydroxamic acid).

In various embodiments, the composition can comprise from 1 μM to about 50 μM, from about 10 μM to about 40 μM, or from about 20 μM to about 30 μM of the HDACi. In various embodiments, the composition comprises about 25 μM of the HDACi.

Ace inhibitors can reduce VEGF-induced corneal neovascularization in rabbits in vivo by regulating angiotensin and angiotensin-converting-enzyme. Further, when applied topically, they can reduce intraocular pressure (TOP) which can be elevated upon SM exposure.

In various embodiments the composition can comprise an ACE inhibitor. The ACE inhibitor can be selected from the group consisting of enalapril, benazepril, captopril, fosinopril, lisinopril, moexipril, perindopril, quinapril, ramipril, trandolapril and any combination thereof. For example, the ACE inhibitor can comprise enalapril.

In various embodiments, the composition can comprise from about 1 μM to about 5004, from about 10 μM to about 4004, or from about 20 μM to about 30 μM of the ACE inhibitor. For example, the composition can comprise about 25 μM of the ACE inhibitor.

Certain water-soluble vitamins, topically applied on rabbit eyes can significantly attenuate an alkylating agent (alkali) induced corneal ulceration and perforation in vivo, inhibit surgery-induced free radical tissue damage and inflammatory cell influx in the cornea, accelerate corneal epithelial healing, and protect epithelial basal cells in vivo. Further, Lee et al showed that ascorbic acid attenuated corneal neovascularization in rabbits in vivo by decreasing VEGF and MMP9 levels.

Accordingly, in any of the embodiments described herein, the composition can further comprise a water-soluble vitamin, such as ascorbic acid (Vitamin C). In various embodiments, the composition can comprise about 1% to about 20%, from about 5% to about 15%, or from about 8% to about 12% of the water-soluble vitamin. For example, the composition can comprise about 10% of the water-soluble vitamin.

Each of the components described herein can be provided in a synergistically effective amount in the composition. For example, when used together, the components can inhibit a cyclooxygenase-2 (COX2), a matrix metallopeptidase (MMP), an inducible nitric oxide synthase (iNOS), myofibroblast formation, neovascularization or a combination of any thereof. In addition, the composition can block inflammatory cytokines known to cause ocular pain, inflammation, more than by inhibiting COX enzymes alone.

An exemplary composition is provided in the table below:

| Ingredient Class | Exemplary Ingredient | Concentration Range | Exemplary Concentration |
| --- | --- | --- | --- |
| NSAID | ketorolac | 0.1-5% | 0.5% |
| HDAC inhibitor | SAHA | 1-50 μM | 25 μM |
| ACE inhibitor | enalapril | 1-50 μM | 25 μM |
| Water soluble vitamin | Ascorbic acid | 1-20% | 10% |

Pharmaceutical Composition

The composition may be formulated for pharmaceutical use. That is, the compositions described herein can be formulated by any conventional manner using one or more pharmaceutically acceptable carriers or excipients as described in, for example, Remington's Pharmaceutical Sciences (A. R. Gennaro, Ed.), 21st edition, ISBN: 0781746736 (2005), incorporated herein by reference in its entirety. Such formulations will contain a therapeutically effective amount of the components described herein (e.g., the NSAID, the HDACi, the Ace inhibitor and/or the vitamin), together with a suitable amount of carrier so as to provide the form for proper administration to the subject. In various embodiments, the carrier comprises water and the composition is an aqueous composition (or formulation).

The term "formulation" refers to preparing the composition in a form suitable for administration to a subject, such as a human. Thus, a "formulation" can include pharmaceutically acceptable excipients, including diluents or carriers. Pharmaceutically acceptable excipients for use in the compositions of the present invention are selected based upon a number of factors including the particular compound used, and its concentration, stability and intended bioavailability; the subject, its age, size and general condition; and the route of administration.

The term "pharmaceutically acceptable" as used herein can describe substances or components that do not cause unacceptable losses of pharmacological activity or unacceptable adverse side effects. Examples of pharmaceutically acceptable ingredients can be those having monographs in United States Pharmacopeia (USP 29) and National Formulary (NF 24), United States Pharmacopeial Convention, Inc, Rockville, Maryland, 2005 ("USP/NF"), or a more recent edition, and the components listed in the continuously updated Inactive Ingredient Search online database of the FDA. Other useful components that are not described in the USP/NF, etc. may also be used.

The term "pharmaceutically acceptable excipient," as used herein, can include any and all solvents, dispersion media, coatings, antibacterial and antifungal agents, isotonic, or absorption delaying agents. The use of such media and agents for pharmaceutical active substances is well known in the art (see generally Remington's Pharmaceutical Sciences (A. R. Gennaro, Ed.), 21st edition, ISBN: 0781746736 (2005)). Except insofar as any conventional media or agent is incompatible with an active ingredient, its use in the therapeutic compositions is contemplated. Supplementary active ingredients can also be incorporated into the compositions.

A "stable" formulation or composition can refer to a composition having sufficient stability to allow storage at a convenient temperature, such as between about 0° C. and about 60° C., for a commercially reasonable period of time, such as at least about one day, at least about one week, at least about one month, at least about three months, at least about six months, at least about one year, or at least about two years. Advantageously, the compositions provided herein may be prepared as stable formulations.

The formulation should suit the mode of administration. The individual components may also be administered in combination with one or more additional agents or together with other biologically active or biologically inert agents. Such biologically active or inert agents may be in fluid or mechanical communication with the agent(s) or attached to the agent(s) by ionic, covalent, Van der Waals, hydrophobic, hydrophilic or other physical forces.

The pharmaceutical compositions can be formulated, for example, for ophthalmic administration. Dosage forms suitable for ophthalmic administration include solutions, suspensions, dispersions, emulsions or any other dosage form that can be administered topically to the eye. Pharmaceutical compositions can include one or more pharmaceutically acceptable excipients. Pharmaceutically acceptable excipients are identified, for example, in The Handbook of Pharmaceutical Excipients, (American Pharmaceutical Association, Washington, D.C., and The Pharmaceutical Society of Great Britain, London, England, 1968). Additional excipients can be included in the pharmaceutical compositions of the invention for a variety of purposes. These excipients can impart properties which enhance retention of the components at the site of administration, protect the stability of the composition, control the pH, facilitate processing of the components into pharmaceutical compositions, and so on. Other excipients include, for example, fillers or diluents, surface active, wetting or emulsifying agents, preservatives, agents for adjusting pH or buffering agents, thickeners, colorants, dyes, flow aids, non-volatile silicones, adhesives, bulking agents, flavorings, sweeteners, adsorbents, binders, disintegrating agents, lubricants, coating agents, and antioxidants.

Compositions and formulations described herein can also be used in combination with other therapeutic modalities, as described further below. Thus, in addition to the therapies described herein, one may also provide to the subject other therapies known to be efficacious for treatment of the disease, disorder, or condition.

Methods of Use

Also provided herein are methods of treating corneal damage and/or ocular toxicity in a subject in need thereof, the method comprising administering to an eye of the subject the composition described herein.

In various embodiments, the corneal damage and/or ocular toxicity can comprise at least one condition selected from the group consisting of: ocular inflammation, corneal edema, breakage in corneal epithelial barrier function, recurrent corneal erosions, epithelial-stromal separation, basement membrane disruption, stromal damage (e.g., damage to ECM, keratocytes, collagen fibrils), corneal endothelium damage, corneal fibrosis, neovascularization of the cornea, limbal stem cell deficiency, and corneal ulcers. The compositions described herein can reduce the severity of one or more of these conditions. As described below, the severity of these conditions can be measured in live animals using clinical eye exams and imaging, and in corneal tissue by histological H&E staining, immunofluorescence, and qPCR techniques, according to standard methods in the art.

The compositions may be administered topically. In various embodiments, the composition may be administered 1 to 5 times a day. For example, the composition may be administered once, twice, 3 times, 4 times or 5 times a day. In various embodiments, the composition may be administered twice a day. Each administration can comprise 1 to 5 drops. For example, the composition may be administered in a dose of 2 drops, per eye, twice a day. The duration of the treatment can be from 1 to 90 days, from 3 to 80 days, from 3 to 70 days, from 3 to 60 days, from 3 to 50 days, from 3 to 40 days, from 3 to 30 days, from 3 to 20 days, or from 5 to 15 days. For example, the duration of the treatment can be from 3 to 14 days. As an additional example, the composition can be administered for 5, 6, 7, 8, 9, 10, 11, 12, 13 or 14 days.

Preferably the composition is administered to the eye of the subject. When administered to the eye, the composition can (a) reduce inflammation and pain as measured by slit-lamp clinical examinations and pachymetry; (b) reduces corneal fibrosis and neovascularization as measured by slit-lamp clinical exams and non-invasive confocal scanning laser microscopy (HRT3-RCM) imaging; (c) reduces or inhibits matrix metallopeptideases (MMPs), cyclooxygenase-2 (COX2), TGFβ, vascular endothelial growth factor (VEGF), alpha-smooth muscle actin (α-SMA), or free radical formation as measured by histological immunofluorescence and qPCR techniques; (d) accelerates physiological wound healing as measured by slit-lamp clinical eye exams, non-invasive confocal scanning laser microscopy (HRT3-RCM) eye imaging and non-invasive multi-modal optical coherence tomography eye imaging; or (e) a combination of any thereof.

In addition, the subject in need thereof may have experienced an eye injury or be at risk of experiencing an eye injury due to a noxious chemical agent such as mustard gas (e.g., sulfur mustard gas, nitrogen mustard gas, or half mustard). That is, the chemical toxicity may be induced by mustard gas (sulfur mustard gas (SM), nitrogen mustard gas (NM) or half mustard).

Having described the invention in detail, it will be apparent that modifications and variations are possible without departing from the scope of the invention defined in the appended claims.

EXAMPLES

The following non-limiting examples are provided to further illustrate the present invention.

The following examples all describe the therapeutic properties of a Turbo Eye Drop (TED), applied topically to the eye. The composition of "TED" used in the following examples is provided in Table 1 herein.

TABLE 1

| Ingredient | Class | Amount |
| --- | --- | --- |
| Ketorolac | NSAID | 0.5% |
| SAHA | HDACi | 25 μM |
| Enalapril | Ace inhibitor | 25 μM |
| Ascorbic Acid | Water soluble vitamin | 10% |

Example 1: Arrest of Acute MGK Pathology, Loss of Epithelial Barrier and Recurrent Corneal Epithelial Erosions, in Rabbits In Vivo by Topical TED FIGS. 1A-1H show results of a clinical diagnostic Fluorescein eye test. This test is specific for reading loss of epithelial barrier and corneal erosions by gauging the area and density of green-dye uptake in the cornea, which tells extent of erosions and defects in corneal epithelium. SM contact to rabbit eyes showed dramatically increased epithelial erosion and deformations on day-3 (FIG. 1C) and day-7 (FIG. 1G) as pointed by the arrowheads compared to the naïve (FIG. 1A, FIG. 1E) or TED-alone treated (FIG. 1B, FIG. 1F) eyes. Topical TED (twice daily for 5 days) on SM-exposed eyes prevented breach in epithelial barrier and erosions as no fluorescein uptake was noted on day-3 (FIG. 1D) or day-7 (FIG. 1H). Interestingly, 50% (3 out of 6) SM-exposed rabbit eyes showed recurring corneal epithelial erosion after 1-month (FIG. 2A) but none of SM+TED eyes at 1-month (FIG. 2B).

Example 2: Rescue of Other Acute MGK Symptoms

Figures 4A, 4B:
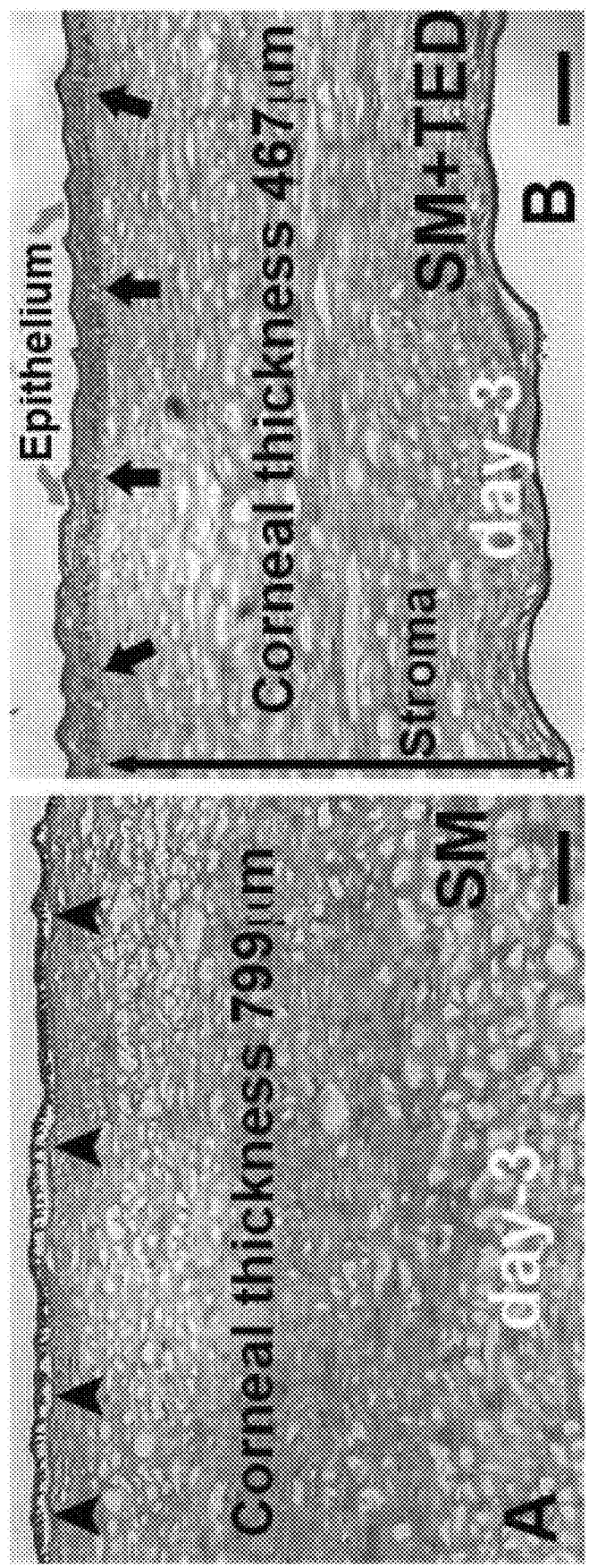
FIG. 4A is an H&E stain showing SM-induced epithelial-stromal separation and basement membrane damage in rabbit cornea in vivo marked by arrowheads on day-3. Corneal thickness is also indicated.
FIG. 4B is an H&E stain showing absence of SM-injury in SM+TED eyes in vivo at day-3. Corneal thickness is also indicated.

Remarkable mitigation of SM-induced epithelial-stromal disruption, basement membrane damage, and corneal edema was noted in human cornea ex vivo (FIGS. 3A-3F) and rabbit eyes in vivo (FIG. 4A-4B) as shown by H&E and integrin-β4 immunostaining specific for the cornea. Rabbit eyes and human corneas in organ culture exposed to SM/NM were analyzed. In human cornea, ex vivo, vehicle (FIG. 3A, FIG. 3D) did not cause injury but nitrogen mustard (NM, 200 μm 30 s; SM-analog) exposure led to acute MGK (FIG. 3B, FIG. 3E). The NM+TED (twice daily for 5 days) treatments showed dramatic rescue of cornea from NM-injury (FIG. 3C, FIG. 3F). In rabbit eyes, in vivo, SM-exposed corneas showed hefty epithelial-stromal separation, basement membrane damage, and edema (FIG. 4A), and a remarkable mitigation of these pathologies was detected in SM+TED corneas (FIG. 4B). It is possible that LSCD and inflammatory cytokines play important role in producing these pathologies of acute MGK in rabbits in vivo, and additional experiments to test this hypothesis are described in Example 5 below.

Example 3: Effects on SM-Induced Acute MGK Pathology Involving Corneal Haze, Edema, and Tearing Rabbit eyes were exposed to SM in +/−TED and live rabbits were examined with slit-lamp and stereo biomicroscopy, pachymetry, and Schirmer eye test in in a real-time manner. Clinical exams performed by 2 ophthalmologists and 1 cornea-scientist in a masked manner found no symptoms such as conjunctival hyperemia, uveitis, corneal opacity, recurrent epithelial defects, dry eye, or compromised intraocular pressure in naïve (FIG. 5A, FIG. 5E, FIG. 5I) or TED-alone treated rabbit eyes (FIG. 5B, FIG. 5F, FIG. 5J) at day 3, day 7, or day 45. Conversely, SM-exposed rabbit eyes demonstrated a significantly high corneal haze and edema on day-3 (FIG. 5C), day-7 (FIG. 5G) and day-14 (FIG. 5K). Topical TED application on SM-vapor exposed eyes markedly reduced corneal haze (an acute MGK) on day-3 (FIG. 5D), on day-7 (FIG. 5H) and on day-14 (FIG. 5L) compared to corresponding-day SM-exposed rabbit eyes (FIG. 5C, FIG. 5G and FIG. 5K). This rescue in corneal haze was shown by topical TED 2 drops twice daily for 5-days. These data suggest that >90% mitigation of SM-induced corneal haze in vivo is possible by TED given 3-times daily for longer period (e.g., Example 5).

Figure 7:
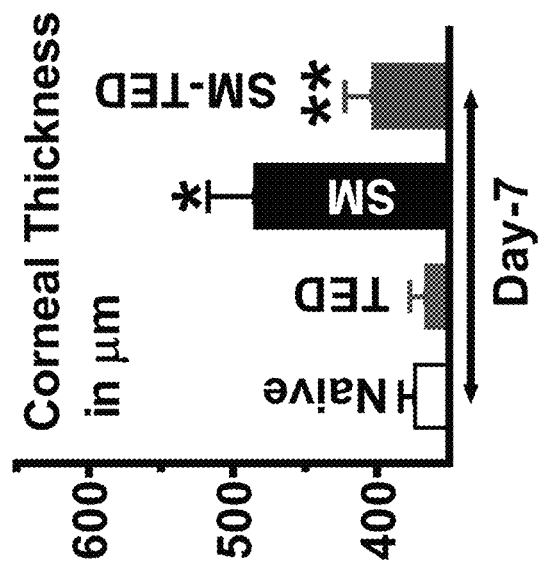
FIG. 7 is bar graph showing average corneal thickness in naïve, TED-alone, SM-exposed, and SM+TED treated eyes, 7 days after SM exposure/TED treatment.
Figure 6:
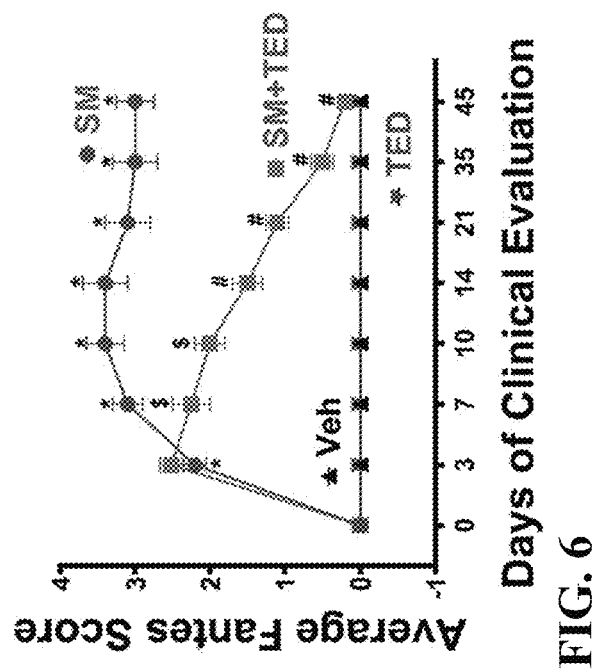
FIG. 6 is a plot showing average Fantes score of eyes treated and examined as described in FIGS. 5A-5L.
Figure 8B:
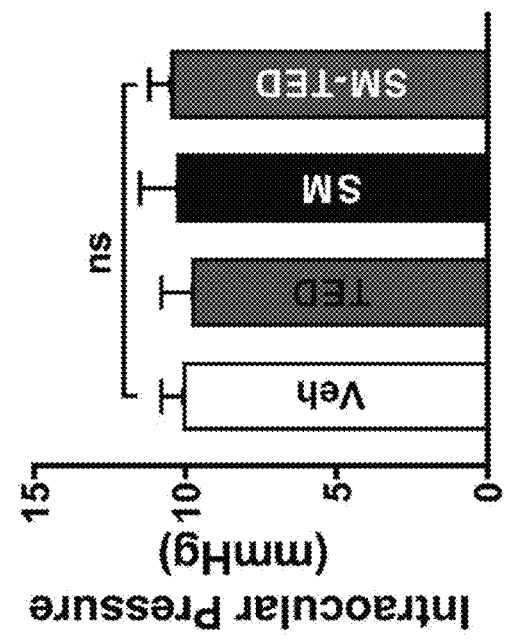
FIG. 8B is a bar graph showing intraocular pressure in naïve, TED-alone, SM-exposed, and SM+TED treated eyes.
Figure 8A:
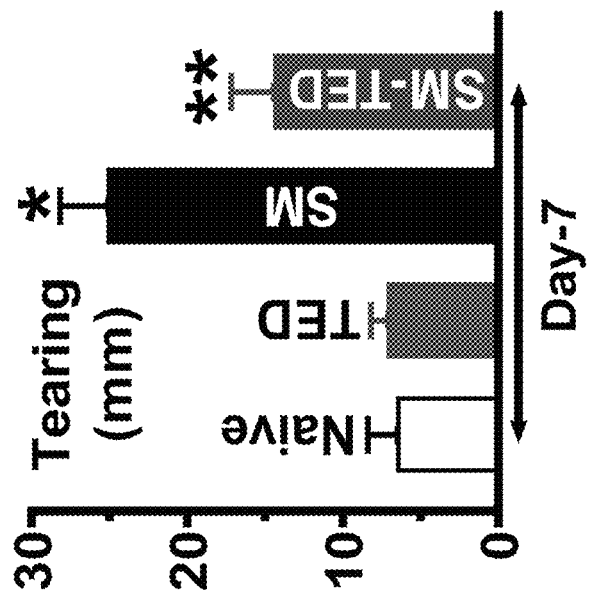
FIG. 8A is a bar graph showing average tearing in naïve, TED-alone, SM-exposed and SM+TED treated eyes 7 days after SM exposure/TED treatment.

Further, we quantified corneal haze using Fantes scale/score, corneal thickness with pachymetry, tearing with Schirmer test, and intraocular pressure with tonometry in rabbit eyes of Naive; topical TED-alone (2-times/day for 5-days; SM only; and SM+TED (2-drops topical twice daily for 5-day) 2-hour after SM. TED potently reduced SM-induced corneal haze (FIG. 6; p<0.01); corneal inflammation/edema (FIG. 7; p<0.01), and excessive tearing (FIG. 8A; p<0.01). Eye pressure in all groups was akin (FIG. 8B).

Example 4: TED Rescued SM-Induced Corneal Endothelial Injury in Acute MGK In Vivo SM is known to injure corneal endothelium, an innermost layer in the cornea vital for corneal hydration and clarity. Thus, the health of corneal endothelium in live rabbits was examined in a time-dependent manner with clinical confocal and specular microscopes. Normal corneal endothelium in naive (FIG. 9A) and TED-alone treated (FIG. 9D) eyes was noted. Conversely, SM-exposure compromised endothelial cell morphology (atypical phenotype, swollen, less in numbers) and hydration (high water-content) (FIG. 9B). Excitingly, TED (2-times per day for 5-days) showed clinically relevant rescue of endothelial damage in acute MGK at day-7 (FIG. 9C).

Figures 10A, 10B:
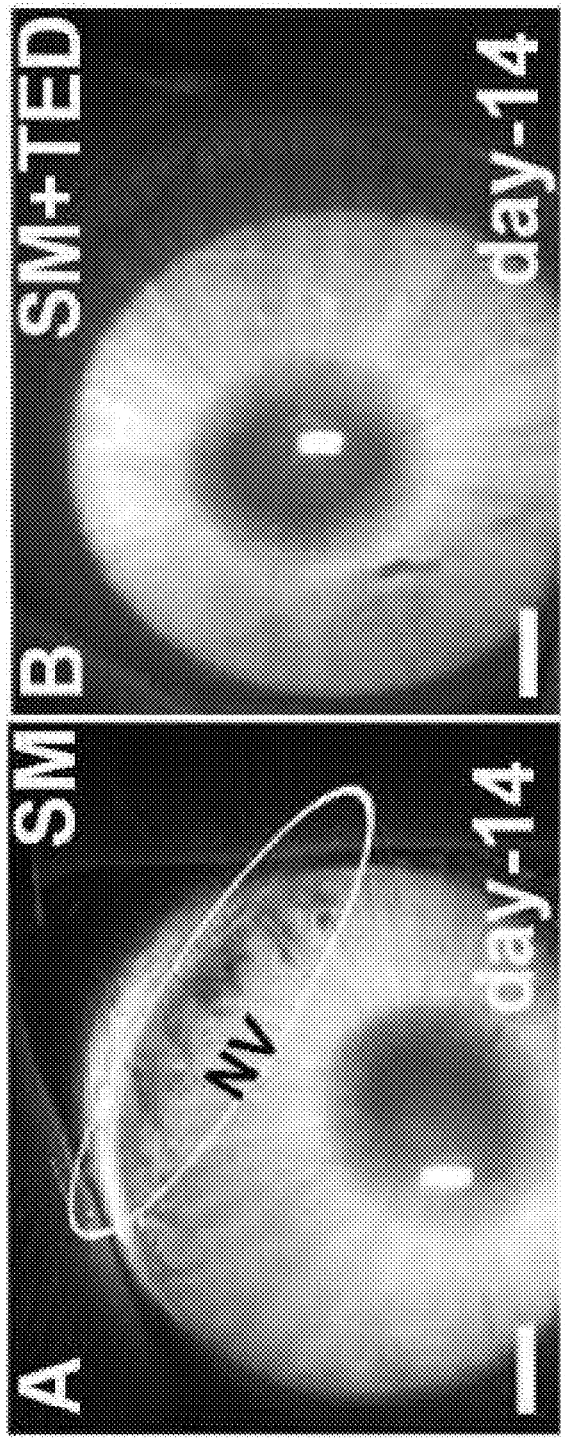
FIG. 10A shows real-time in vivo stereo-microscopy imaging showing SM injury causes ingrowth of neo-vessels (NV) in rabbit eyes (A).
FIG. 10B shows real-time in vivo stereo-microscopy imaging showing that topical TED drops halted neovascularization (NV) in SM+TED treated eyes.

Effective seizure of SM-induced acute MGK corneal neovascularization (NV) in rabbits in vivo. Patients with acute MGK show haze and NV. Clinical stereo-microscopy performed in live rabbits exposed to SM in +/−TED. SM-injury caused vision-impairing NV in all six rabbit eyes (FIG. 10A). Topical TED halted NV 40-85% (FIG. 10B; p<0.01) in 4 of the 6 SM+TED rabbit eyes at current dose at acute MGK stage of day-14 (FIG. 10B).

Example 5: Proposed Experiments to Test TED Effect on Acute MGK Toxicity

Potential parameters for proposed studies to further test TED effect on acute MGK toxicity may include the following: Zealand White rabbits (2.5-3.0 kg) may be purchased from an approved vendor. Table 2 shown below provides details of groups, eye used, SM-vapor dose, TED regimens, timepoints, eyes/point (n=6), eye exams & imaging timing, and euthanasia-timing. A total of 72 New Zealand white rabbits may be used for acute safety and efficacy studies. Group-1: may have no treatment to eye (naive); Group-2 may have SM-vapor only; Group-3; may have TED-alone topically; and Group-4 may have SM+TED dose shown below in Table. Ocular health, clinical exams, and imaging in live rabbits of all groups may be gauged in a masked manner at times using slit-lamp, specular, and confocal microscopes, optical coherence tomography, pachymetry, tonometry, Schirmer's and fluorescein eye tests, and McDonald-Shadduck Scoring System. Six eyes for each endpoint may be used for statistical analysis, based on power analysis, and may be used. Euthanasia may be given at selected endpoints, corneal tissues may be cryo-preserved, serial sectioned with cryostat, subjected to immunofluorescence, RNA isolation, cDNA prep, real-time qPCRs, western blotting, TUNEL, and cytotoxicity assays using our published protocol. In each experiment, we may use suitable positive and negative controls. For immunostaining, negative controls may be irrelevant isotype-matched primary antibodies, use of primary/secondary antibody alone, and tissue sections from naive eyes, and in qPCR master mix without cDNA in qPCR reactions. Quantification of stained sections may be done counting positive immuno-stained cells in 7 non-overlapping, full thickness columns extending from the anterior stromal surface to posterior stromal surface in a blinded manner in each cornea at 400× microscope field. The columns for counts may be picked at random from the central cornea. Six columns may be averaged for each cornea as previously reported.

For acquisition, management, and analysis of scientific data, the studies in this example have been organized into 7 experiments as described below and each may use published methods (see e.g., Marlo T L, Giuliano E A, Sharma A, Mohan R R. Development of a novel ex vivo equine corneal model. Vet Ophthalmol. 2017; 20:288-293; Tripathi R, Giuliano E A, Gafen H B, Gupta S, Martin L M, Sinha P R, Rodier J T, Fink M K, Hesemann N P, Chaurasia S S, Mohan R R. Is sex a biological variable in corneal wound healing? Exp Eye Res. 2019; 187:107705; Gouveia R M, Lepert G, Gupta S, Mohan R R, Paterson C, Connon C J. Assessment of corneal substrate biomechanics and its effect on epithelial stem cell maintenance and differentiation. Nat Commun. 2019; 10:1496; Mohan R R, Tripathi R, Sharma A, Sinha P R, Giuliano E A, Hesemann N P, Chaurasia S S. Decorin antagonizes corneal fibroblast migration via caveolae-mediated endocytosis of epidermal growth factor receptor. Exp Eye Res. 2019; 180:200-207.; Gupta S, Fink M K, Ghosh A, Tripathi R, Sinha P R, Sharma A, Hesemann N P, Chaurasia S S, Giuliano E A, Mohan R R. Novel Combination BMP7 and HGF Gene Therapy Instigates Selective Myofibroblast Apoptosis and Reduces Corneal Haze In Vivo. Invest Ophthalmol Vis Sci. 2018; 59:1045-1057; Anumanthan G, Gupta S, Fink M K, Tripathi R, Hesemann N P, Bowles D K, McDaniel L M, Muhammad M, Mohan R R. KCa3.1 ion channel: a novel therapeutic target for corneal fibrosis. PLoS One. 2018; 13: e0192145; Lim R R, Tan A, Liu Y C, Barathi V A, Mohan R R, Mehta J S, Chaurasia S S. ITF2357 transactivates Id3 and regulate TGFβ/B1VIP7 signaling pathways to attenuate corneal fibrosis. Sci Rep. 2016; 6:20841; Chaurasia S S, Lim R R, Parikh B H, Yeo S W, Tun B B, Wong T Y, Luu C D, Agrawal R, Ghosh A, Mortellaro A, Rackoczy E, Mohan R R, Barathi V A. The NLRP3 inflammasome may contribute to pathologic neovascularization in the advanced stages of diabetic retinopathy. Sci. Reports 2018; 8:2847; Wilson S E, Mohan R R, Mohan R R, Ambrósio R, Hong J, Lee J. The corneal wound healing response: cytokine-mediated interaction of the epithelium, stroma, and inflammatory cells. Prog Retin Eye Res. 2001; 20:625-637; Tandon A, Tovey J C K, Sharma A, Gupta R, Mohan R R. Role of transforming growth factor beta in corneal function, biology and pathology. Curr Mol Med. 2010; 10:565-578. Wilson S E, Liu J J, Mohan R R. Stromal-epithelial interactions in the cornea. Prog Retin Eye Res. 1999; 18:293-309; Vij N, Sharma A, Thakkar M, Sinha S, Mohan R R. PDGF-driven proliferation, migration, and IL8 chemokine secretion in human corneal fibroblasts involve JAK2-STAT3 signaling pathway. Mol Vis. 2008; 14:1020-1027; Stapleton W M, Chaurasia S S, Medeiros F W, Mohan R R, Sinha S, Wilson S E. Topical interleukin-1 receptor antagonist inhibits inflammatory cell infiltration into the cornea. Exp Eye Res. 2008; 86:753-757; Wilson S E, Mohan R R, Netto M, Perez V, Possin D, Huang J, Kwon R, Alekseev A, Rodriguez-Perez J P. RANK, RANKL, OPG, and M-CSF Expression in Stromal Cells during Corneal Wound Healing. Invest Ophthalmol Vis Sci. 2004; 45:2201-2211; Mohan R R, Hutcheon A E K, Choi R, Hong J-W, Lee J-S, Mohan R R, Ambrósio R, Zieske J D, Wilson S E: Apoptosis, necrosis, proliferation, and myofibroblast generation in the stroma following LASIK and PRK. Exp Eye Res 2003:76:71-87; Gronkiewicz K, Giuliano E A, Kuroki K, Bunyak F, Sharma A, Teixeira L B, Hamm C W, Mohan R R. Development of a novel in vivo corneal fibrosis model in the dog. Exp Eye Res. 2016; 143:75-88; Netto M V, Mohan R R, Sinha S, Sharma A, Dupps W, Wilson S E. Stromal haze, myofibroblasts, and surface irregularity after PRK. Exp Eye Res. 2006; 82:788-797; Sharma A, Anumanthan G, Reyes M, Chen H, Brubaker J W, Siddiqui S, Gupta S, Rieger F G, Mohan R R. Epigenetic Modification Prevents Excessive Wound Healing and Scar Formation After Glaucoma Filtration Surgery. Invest Ophthalmol Vis Sci. 2016; 57:3381-3389; Anumanthan G, Sharma A, Waggoner M, Hamm C W, Gupta S, Hesemann N P, Mohan R R. Efficacy and Safety Comparison Between Suberoylanilide Hydroxamic Acid and Mitomycin C in Reducing the Risk of Corneal Haze After PRK Treatment in Vivo. J Refract Surg. 2017; 33:834-839; Gupta S, Rodier J T, Sharma A, Giuliano E A, Sinha P R, Hesemann N P, Ghosh A, Mohan R R. Targeted AAV5-Smad7 gene therapy inhibits corneal scarring in vivo. PLoS One. 2017; 12:e0172928; Sharma A, Mehan M M, Sinha S, Cowden J W, Mohan R R. Trichostatin A inhibits corneal haze in vitro and in vivo. Invest Ophthalmol Vis Sci. 2009; 50:2695-2701; Tandon A, Tovey J C K, Waggoner M R, Sharma A, Cowden J W, Gibson D J, Liu Y, Schultz G S, Mohan R R. Vorinostat: A Potent Agent to Prevent and Treat Laser-induced Corneal Haze. J Refract Surg. 2012; 28:285-290; and Sharma A, Sinha N R, Siddiqui S, Mohan R R. Role of 5'TG3'-interacting factors (TGIFs) in Vorinostat (HDAC inhibitor)-mediated Corneal Fibrosis Inhibition. Mol Vis. 2015; 21:974-984). The disclosures of each are incorporated herein by reference with respect to such methods.

TABLE 2

| Gr | Treatment | Eye used | TED* Dosage | End points (n = 6/time) | Total Rabbits |
|---|---|---|---|---|---|
| Regimen-1 Acute Efficacy and Safety Evaluation ||||||
| 1 | Untreated | Right | none | 3-day, 7-day, and 14-day | 18 |
| 2 | **SM-vapor only | Left | none | 3-day, 7-day, and 14-day | |
| 3 | TED* only | Right | 7-day | 3-day, 7-day, and 14-day | 18 |
| 4 | SM-vapor + TED* | Left | 7-day | 3-day, 7-day, and 14-day | |
| Regimen-2 Acute Efficacy and Safety Evaluation ||||||
| 5 | Untreated | Right | none | 3-day, 7-day, and 14-day | 18 |
| 6 | SM-vapor only | Left | none | 3-day, 7-day, and 14-day | |
| 7 | TED* only | Right | 14-day | 3-day, 7-day, and 14-day | 18 |
| 8 | SM-vapor + TED* | Left | 14-day | 3-day, 7-day, and 14-day | |
| | Total number of rabbits | | | | 72 |

Note:
Left eyes may be used for efficacy studies. Contralateral right eyes may be used as control for efficacy studies or the safety evaluations of TED. This design is chosen based on the 3R animal rule to minimize the use of rabbits for research.
**Dose of SM vapor [200 mg-min/m$^3$]
*= 2-drops 3-times daily topically for 7-days or 14-days as shown in table. Clinical eye exams & imaging: before injury, 1 d, 2 d, 3 d, 7 d, & 14 d or as needed.

Exp-1 is intended to collect data on conjunctival hyperemia, uveitis, corneal opacity, tearing, and corneal NV in live rabbits in vivo from clinical eye exams and imaging with slit-lamp, specular and confocal microscopes before injury, and 1-, 2-, 3-, 7-, and 14-day after SM injury and +/−TED in a masked manner. Exp-2 is intended to measure recurrent epithelial defects and LCSD in the rabbit eyes exposed to SM and its mitigation with TED drops using biomicroscopy images and morphometric analysis of epithelial thickness in limbus and central corneal regions. Biochemical methods like impression cytology and immunostaining with ABCG2, a member of the ATP binding cassette (ABC) transporters, and p63 recognized as the limbal cell markers in the cornea may also be used. Exp-3 is intended to examine the corneal edema, abrasion, and haze in vivo in live animals using pachymetry, ocular pressure by tonometry, tearing by Schirmer's test, epithelial erosions/defects by fluorescein eye test before injury, and 1-, 2-, 3-, 7-, and 14-day after SM injury and +/−TED to define TED's dose regimens against SM injury in vivo. Fantes scale may gauge haze/opacity levels in rabbit corneas. Exp-4 is intended to determine ocular pain, irritation, and sensitivity of light to rabbit eyes in vivo with Modified McDonald-Shadduck Scoring Systems and in tissue sections with β-tubulin immunostaining by studying corneal nerves as reported. Exp-5 is intended to focus on studying endothelial defects in various stages of the SM-induced ocular injury in live rabbits with specular and confocal microscopes and optical coherence tomography. After euthanasia, endothelial cell count and cell death may be measured using, ZO1, Na+/K+-ATPase activity and TUNEL assay. Exp-6 is intended to clarify cellular and biochemical alterations in rabbit corneas collected after euthanasia and were +/−SM and +/−TED to define safety and efficacy of TED. The integrity of basement membrane and epithelial-stromal organization may be measured with H&E, Collagen IV, and integrin-β4 stainings. Also, this example is intended to test immune reaction with H&E and inflammatory markers (Mac1, CD11b, & F4/80), and apoptosis with TUNEL assay.

Exp-7 is intended to quantify changes in mRNA and proteins of fibrotic and angiogenic genes (TGFβ, αSMA, Col, VEGF, tenacin, etc.) with real-time qPCR and immunofluorescence using suitable negative and positive controls.

Anticipated Outcome: It is anticipated that TED topical therapy will effectively mitigate acute SM-vapor toxicity to eye in vivo without significant side effects. Clinically, TED should treat ocular/corneal defects and edema by regulating corneal wound healing events. Furthermore, TED therapy should significantly prevent SM-induced epithelial-stromal separation and preserve basement membrane integrity in the cornea in vivo.

Example 6: Rescue of Delayed-MGK Corneal Haze and Neovascularization (NV) in Rabbits In Vivo Lack of animal-data on delayed-onset MGK and effective mitigation of acute MGK by topical TED led to the following pilot delayed-onset MGK studies. After their approval, 20 rabbits were exposed to SM. Once SM was cleared, rabbits were transported to a full-fledged ophthalmology lab equipped with all diagnostic imaging tools and ophthalmologists for continuous monitoring of delayed-onset MGK symptoms and resolution by TED therapy for 90 days. Out of 40 rabbit eyes, 14 were naive (group-1), 6 had TED-alone (twice daily for 5 days) topically (group-2), 6 had SM-vapor only (group-3), and 14 had SM+TED (twice daily for 5 day) topically (group-4). All eyes were subjected to clinical eye exams and imaging for 90-days, and thereafter corneas were collected for cellular and molecular pilot studies.

Figures 11A, 11B:
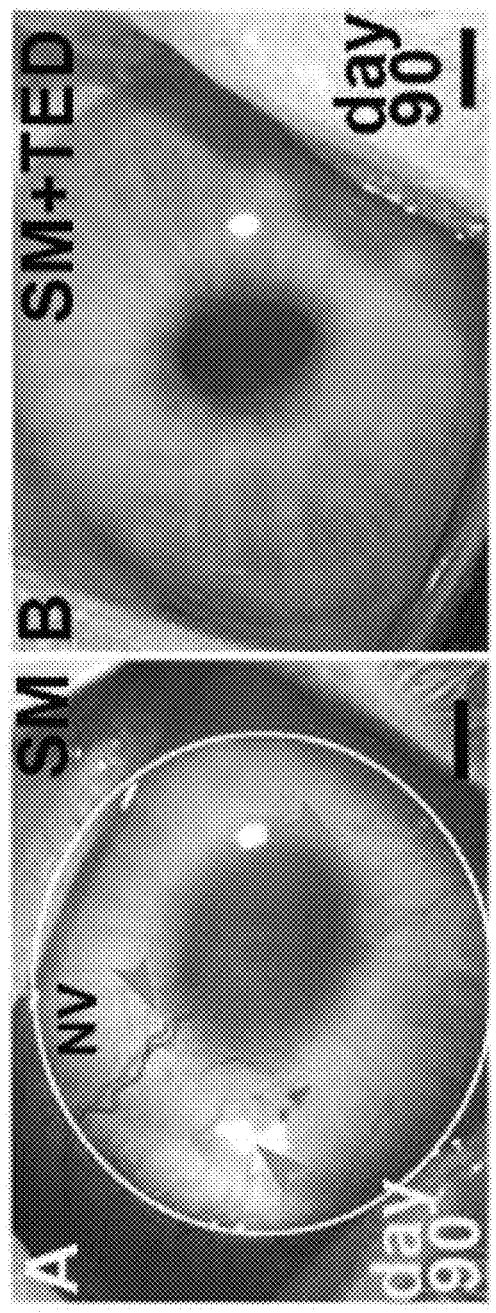
FIG. 11A is a slit-lamp microscopy image of a rabbit eye 90 days after SM exposure, showing corneal haze and NV indicative of delayed-MGK.
FIG. 11B is a slit-lamp microscopy image of a rabbit eye 90 days after SM exposure and subsequent TED treatment, showing >90% resolution of haze and NV.
Figure 11C:
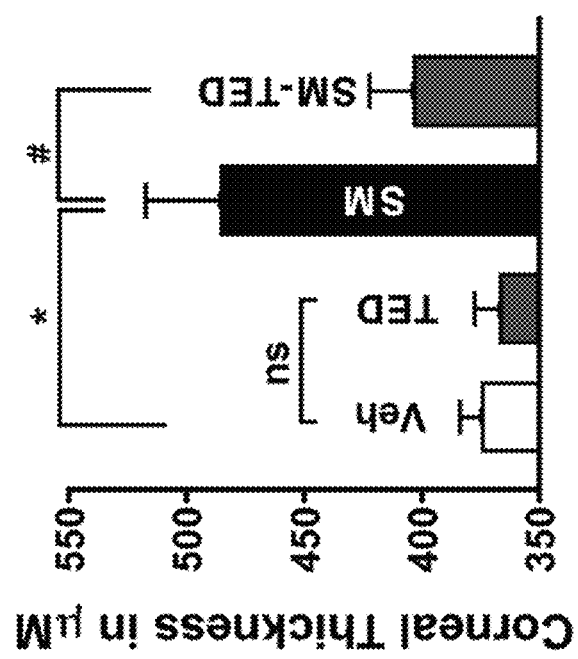
FIG. 11C is a bar graph showing corneal thickness in naïve, TED-treated, SM-exposed, and SM+TED treated corneas.

None of the Naive or TED-only eyes showed corneal abnormalities at day-90; the longest tested time. 5 of the 6 (83%) SM-exposed eyes showed a significant haze and neovascularization (NV) compared to naive eyes (FIG. 11A; p=<0.01). Most notably, all 14 SM+TED-treated (twice daily for 5 day started 2 hours after SM) eyes showed significantly decreased NV from 45-90% compared to the SM-exposed eyes (FIG. 11B; p=<0.001) at day-90; longest tested time (FIG. 11B). Pachymetry detected 15-43% thicker corneas in SM-injured eyes (419-48104) as compared to Naive (350-37004) or TED-alone (350-38004) treated eyes (FIG. 11C). Importantly, TED therapy showed a notably less corneal thickness (23-78%; 370-43004) (FIG. 11C). Likewise, up to 57% reduced tearing was observed in SM+TED treated eyes compared to SM-only eyes which had 42-60% increased tearing compared to naive. Eye pressures were about same in naive, TED-alone, SM-vapor, and SM+TED eyes.

Stromal cell density and health of endothelial cells were also studied in the corneas of all 4 groups in live animal up to 90 days with the clinical confocal and specular microscopes. These two parameters are important for normal corneal function and transparency, and clear vision. The confocal microscopy images of the anterior stroma and posterior stroma collected at day-90 are presented in FIG. 12A-FIG. 12C and FIG. 13A-FIG. 13C, respectively. SM exposed rabbit cornea showed significantly higher keratocyte reflectivity due to cloudiness in corneal anterior stroma (FIG. 12B) compared to the naive (FIG. 12A) groups. Topical TED (2 drops twice/day for 5 days) blocked delayed-MGK, keratocyte reflectivity, and diminished haze significantly (FIG. 12C). Posterior corneal stroma did not show any significant deformities in SM-exposed (FIG. 13B) eyes as levels of haze and light reflectivity was almost similar to the naive (FIG. 13A) and SM+TED eyes (FIG. 13C).

Figures 14A, 14B, 14C:
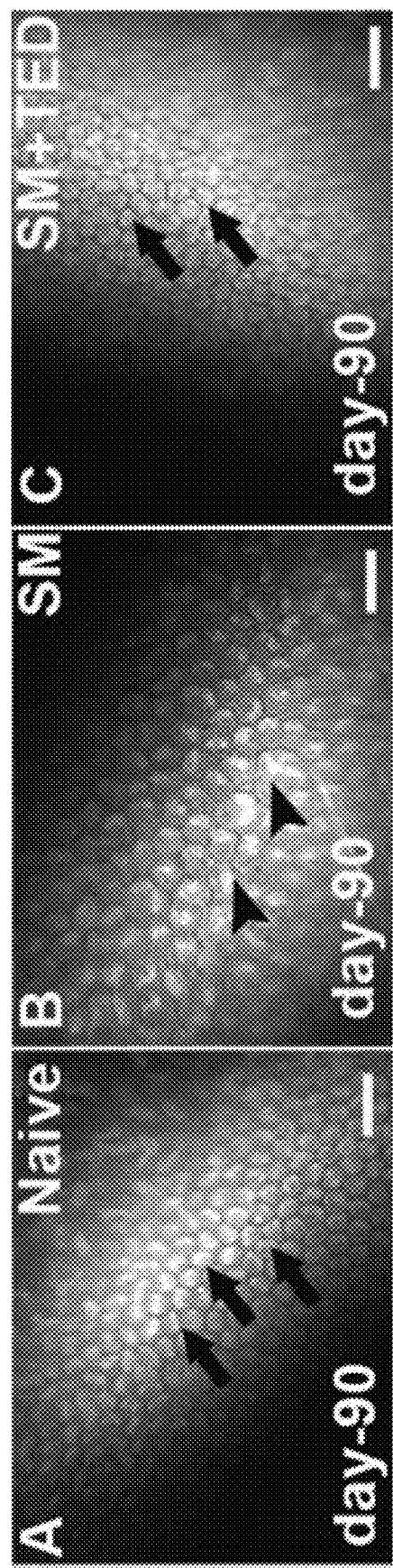
FIG. 14A is a confocal image of cornea in a naïve, unexposed, eye.
FIG. 14B is a confocal image of cornea in an SM-exposed eye showing delayed MGK features (loss of endothelial normal hexagonal shape, edema, and swelling) at 90-days.
FIG. 14C is a confocal image of cornea in a SM-exposed eye treated with TED. SM-induced pathology was alleviated by topical TED therapy 90 days out from exposure.
Figure 15A:
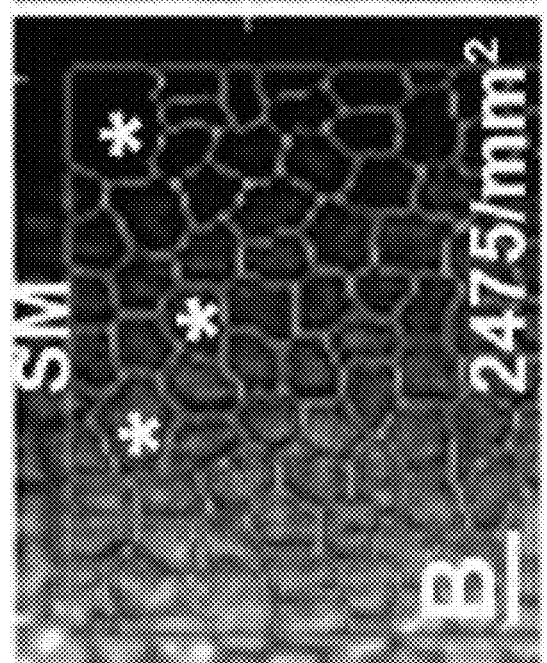
FIG. 15A is a clinical specular microscopy image showing shape, count, and health of corneal endothelial cells in vivo at day-90 in live, naïve, rabbits.
Figure 15B:
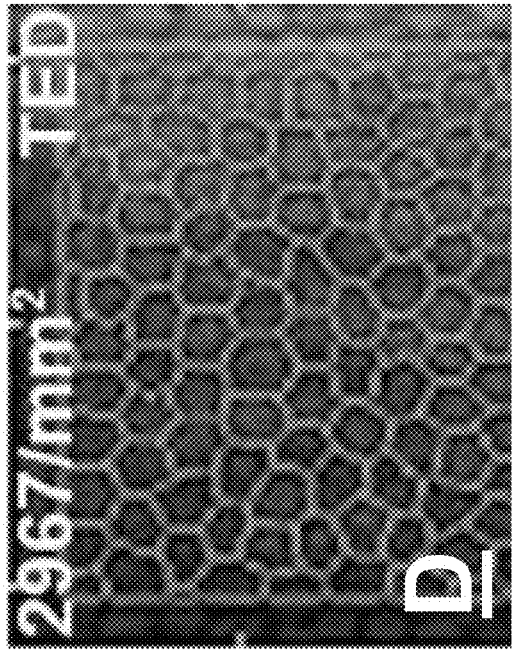
FIG. 15B is a clinical specular microscopy image showing shape, count, and health of corneal endothelial cells in vivo at day-90 in live, SM-treated rabbits SM-injury resulted in loss of cell count (~20%), normal-shape, and overall health (asterisk).
Figure 15C:
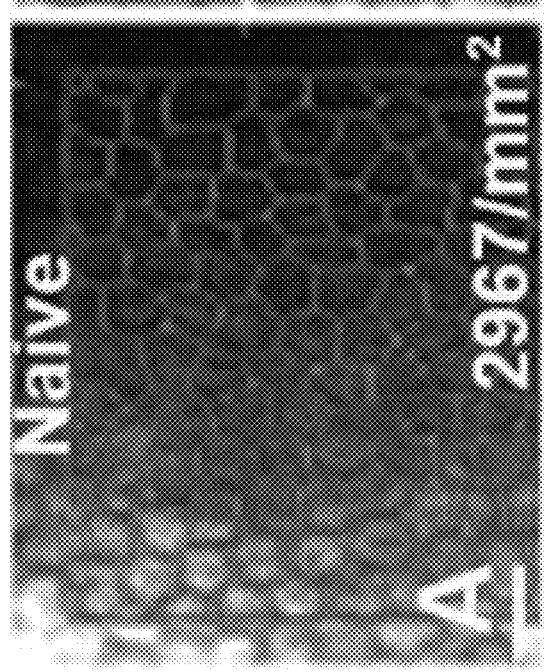
FIG. 15C is a clinical specular microscopy image of TED treated, SM-exposed corneas. The SM injuries were mitigated considerably by topical TED.
Figure 15D:
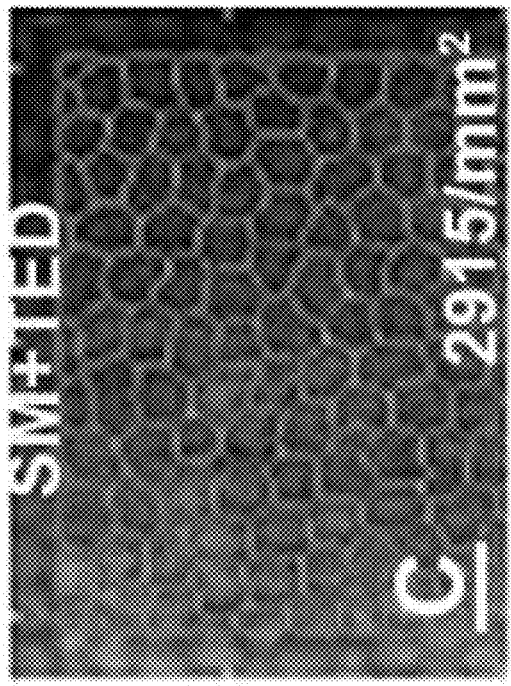
FIG. 15D is a clinical specular microscopy image showing shape, count and health of corneal endothelial cells in vivo at day-90 in live TED treated rabbits.

Example 7: Topical TED Rescued Delayed-Onset MGK Main Symptom, Corneal Endothelial Loss and Dysfunction, Following SM Exposure Quantitative clinical imaging of corneal endothelial cell shape, number, and health in eyes of live rabbits were performed in rabbits of all 4 groups up to 90-days to study effects of TED therapy on delayed MGK onset from SM injury. Naive rabbit eyes showed normal hexagonal shape of corneal endothelium (FIG. 14A) whereas SM-exposure destroyed normal hexagonal shape, caused edema/swelling, and led to loss of normal endothelial function as marked by arrowheads in FIG. 14B. The distorted endothelial cellular morphology and function were alleviated by topical TED (2-drops twice daily for 5 day) in SM-injured rabbit eyes (FIG. 14C; marked by arrows). Since confocal microscopy provides assessment of endothelium at low resolution, specular microscope was used for the high-resolution images and quantitative analysis of endothelial cells in rabbit eyes of all 4 groups. SM-exposed corneas showed an average of 20% less endothelial cell count, loss of hexagonal architecture, and distorted cellular morphology (FIG. 15B) than the naive (FIG. 15A). This SM-induced delayed MGK onset was reversed by the topical TED drops with 2915/mm$^2$ cell counts (FIG. 15C) which was almost similar levels of the naive endothelial cell count 2967 mm$^2$ (FIG. 15A). The endothelial counts in a normal cornea are 3000/mm$^2$. The loss of corneal endothelial cells in rabbit eyes after SM exposure ranged from 11-23%, which was restored by the topical application of TED 2 drops twice daily for 5 days in 70% rabbits. TED alone treatment has no significant effect on the corneal endothelial cells (FIG. 15D). It is anticipated that TED application for longer duration will fully stop corneal endothelial loss and damage, which in-turn will prevent delayed MGK-onset caused by the SM exposure.

Figures 16A, 16B, 16C, 16D:
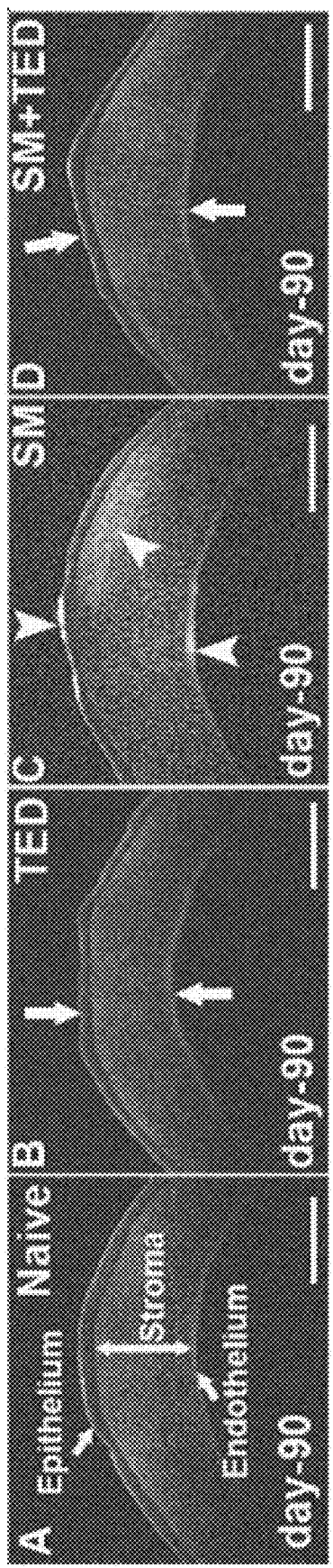
FIG. 16A is a representative clinical optical coherence tomography (OCT) image showing health of corneal epithelium, stroma, and endothelium corneas of live naïve rabbit at 90-day.
FIG. 16B is a representative clinical OCT image showing a TED-treated cornea showing normal features relative to naïve cornea (see FIG. 16A).
FIG. 16C is a representative clinical OCT image of an SM-exposed cornea showing abnormalities in all three corneal layers (corneal epithelium, stroma and endothelium) 90 days out from exposure.
FIG. 16D is a representative clinical OCT image of an SM-exposed cornea, treated with TED showing improvements in all three corneal layers relative to SM-alone corneas (FIG. 16C). Image taken 90 days after exposure and treatment.

Example 8: Retention of Corneal Transparency from TED by Averting SM-Induced Delayed MGK Onset Maintenance of corneal transparency is a pre-requisite for clear vision. Optical coherence tomography (OCT), used in human eye clinic to diagnose irregularities/defects of corneal and other eye tissues, was used to determine corneal health, transparency, and any defect in 3 major corneal cells (epithelium, stroma and endothelium). OCT imaging of the naive cornea showed intact epithelium, stroma, and a monolayer of endothelium (FIG. 16A). TED-alone caused no changes in these corneal layers, and found to be safe for 90 days (FIG. 16B). However, SM-injury to rabbit eyes led to epithelial damage, haze, hyper reflectivity in the anterior stroma (arrowhead), and endothelial swelling (arrowhead) in the cornea in vivo; and represents loss of vision in rabbits (FIG. 16C). Topical TED therapy (2-drops 3-times daily for 5-days) averted corneal irregularities, and led to retention of corneal transparency (FIG. 16D) by minimizing impact of SM on these corneal cells.

Data presented in FIGS. 11-16 on SM-induced delayed-MGK-onset provide strong evidence that topical TED can be an effective countermeasure for SM-driven biphasic ocular toxicity and blinding condition.

Example 9: Proposed Experiments to Test Effect of Topical TED on Delayed MGK Toxicity Potential parameters for proposed studies to further test the effect of topical TED on delayed MGK toxicity: New Zealand White rabbits (2.5-3.0 kg; purchased from an approved vendor) may be exposed to the SM-vapor at the MRI Global. Table 3 below describes details of groups, treatments, imaging times, endpoints, etc. To establish potent effective therapeutic window for SM-induced delayed onset of MGK and ocular toxicity, rabbit eyes may be exposed to SM-vapor (200 mg-min/m3) in +/−TED topical regimens (2 drops twice daily for 1-, 2-, or 4-weeks) in vivo. A total of 144 rabbits may be used. A minimum of 6 rabbits may be used for each time for statistical analysis based on power analysis and our prior published studies. Rabbit eyes may be subjected to clinical eye exam/imaging with slit-lamp, specular, and confocal microscopes, optical coherence tomography, pachymetry, tonometry, Schirmer's and fluorescein eye tests, and McDonald-Shadduck Scoring System in a blinded manner at various times for 1 year at times given in Table 3 below under general anesthesia. At selected endpoints, corneal tissues may be cryopreserved, serial sectioned, and subjected to histological and molecular studies following our published protocols. In each experiment, we may use appropriate negative and positive controls. Quantification and statistical analyses of data may be done as detailed in above using published protocol. 6 experiments detailed below may be conducted using previously published protocols, such as those in the references described in Example 5.

TABLE 3

| Gr | Treatment | Eye used | TED* dose | End points (n = 6/time) | Rabbits |
|---|---|---|---|---|---|
| Regimen-1 Delayed-onset Efficacy and Safety Evaluation ||||||
| 1 | Untreated | Right | None | 2-m, 4-m, 8-m, and 12-m*** | 24 |
| 2 | SM-vapor only | Left | None | 2-m, 4-m, 8-m, and 12-m* | |
| 3 | TED* only | Right | 1-week | 2-m, 4-m, 8-m, and 12-m*** | 24 |
| 4 | **SM-vapor + TED* | Left | 1-week | 2-m, 4-m, 8-m, and 12-m*** | |
| Regimen-2 Delayed-onset Efficacy and Safety Evaluation ||||||
| 5 | Untreated | Right | None | 2-m, 4-m, 8-m, and 12-m*** | 24 |
| 6 | SM-vapor only | Left | None | 2-m, 4-m, 8-m, and 12-m* | |
| 7 | TED* only | Right | 2-week | 2-m, 4-m, 8-m, and 12-m*** | 24 |
| 8 | **SM-vapor + TED* | Left | 2-week | 2-m, 4-m, 8-m, and 12-m*** | |
| Regimen-3 Delayed-onset Efficacy and Safety Evaluation ||||||
| 9 | Untreated | Right | None | 2-m, 4-m, 8-m, and 12-m*** | 24 |
| 10 | SM-vapor only | Left | None | 2-m, 4-m, 8-m, and 12-m* | |
| 11 | TED* only | Right | 4-week | 2-m, 4-m, 8-m, and 12-m*** | 24 |
| 12 | **SM-vapor + TED* | Left | 4-week | 2-m, 4-m, 8-m, and 12-m*** | |
| | Total number of rabbits | | | | 144 |

Note:
Left eyes are used for efficacy studies. Contralateral-right eyes may be used as control for efficacy studies or for safety evaluations of TED. This may minimize rabbit # as per 3R rule.
*= TED topically 2 drops 2-times daily for 1-week, 2-week or 4-week as indicated above.
**SM vapor dose = 200 mg-min/m$^3$
***m = Month. d = day, w = week, 0 d = before injury. Clinical eye exams & imaging: 0 d, 1 d, 3 d, 7 d, 2 w, 1 m, 2 m, 4 m, 8 m, & 12 m or as needed.

Exp-1 is intended to collect data on conjunctival hyperemia, uveitis, corneal opacity, recurrent epithelial defects, dry eye, and corneal neovascularization in live rabbits in vivo for all groups by executing clinical eye exam/imaging with slit-lamp, specular and confocal microscopes in masked manner by at least 2 ophthalmologists. Exp-2 is intended to scan corneal health and abrasions in live rabbits in vivo for all groups with pachymetry (corneal thickness), tonometry (ocular pressure), Schirmer's (dry eye and tearing) at times shown in Table above. Exp-3 is intended to define the ocular pain, irritation, and sensitivity to light in live rabbits in vivo for all groups with Modified McDonald-Shadduck Scoring Systems at times shown in Table above. After euthanasia, status of corneal nerves with β-tubulin immunostaining in corneal sections may be performed. Exp-4 is intended to examine the progression of corneal stromal wound healing, corneal fibrosis and neovascularization at various time-points mentioned in table 2 in live rabbits, and in corneal sections with immunofluorescence, western blots for fibrosis (TGFβ, Collagen I & IV), and angiogenesis (CD31 and lectin) expression. Exp-5 is intended to study the health of corneal endothelial cells in live rabbits in vivo for all groups for up to 1-year to understand the late-onset of SM-induced corneal damage using specular microscopy and OCT. We may also perform cellular assays to measure Na$^+$/K$^+$-ATPase activity and zona occludins (ZO-1, -2 and -3) for the tight junction function, and apoptotic death in corneal endothelial cells with TUNEL assay. Exp-6 is intended to use the transmission electron microscopy to examine corneal epithelial cell integrity, corneal collagen fibril arrangements, stromal regularity, and endothelial cell architecture.

Anticipated Outcome: Clinically, we anticipate TED is intended to prevent SM-induced corneal injury, corneal fibrosis and NV, and restore normal vision. TEM may provide data to identify damage/restoration of tissue at the ultrastructural level in corneal architecture. We have adapted 3-regimen approach to treat SM toxicity to the eye in order to standardize the duration of TED therapy based on the severity of the corneal damage. The present aim is intended to also provide the long-term safety data (1-year) for TED, a key indicator for the further development of the drug. Further, complete analysis may be useful in determining the repurposing of TED for corneal pathologies caused by other vesicating agents.

Example 10: Mechanisms Used by TED to Counter MGK in Human Cornea Ex Vivo

Figure 17:
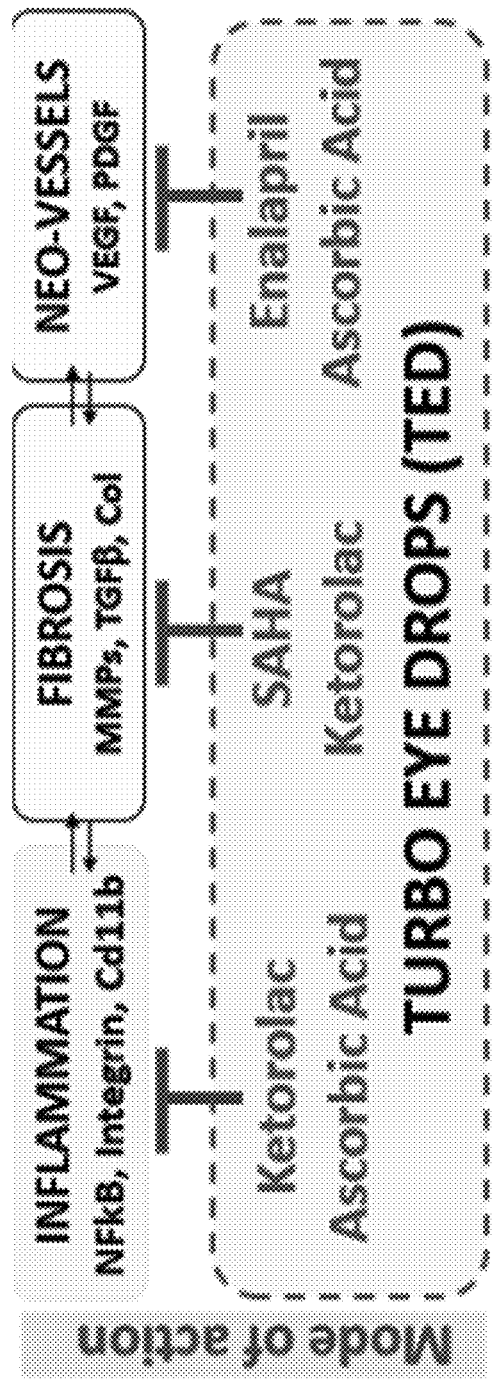
FIG. 17 is a diagram illustrating proposed mechanisms of action for the components in Turbo Eye Drops (TED).
Figures 18A, 18B, 18C:
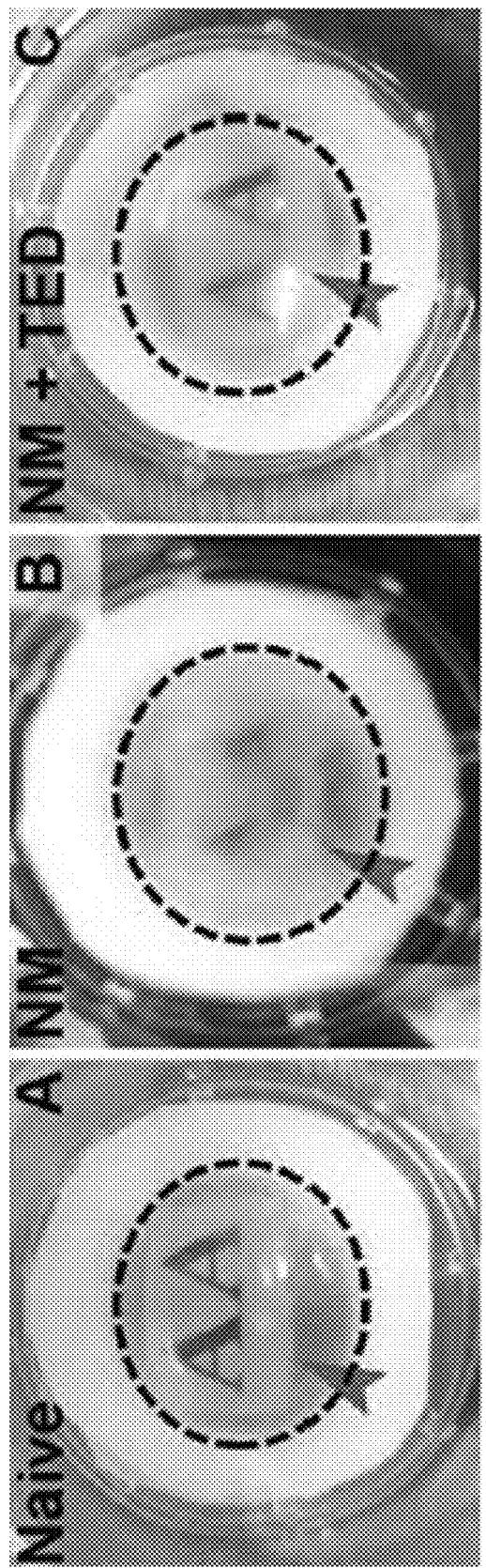
FIG. 18A is an image of an isolated, untreated, cornea showing normal transparency and resolution.
FIG. 18B is an image of an NM-exposed cornea showing severe corneal damage and opacification.
FIG. 18C is an image of a cornea exposed to NM and then treated with TED topically for 8 h/day for 3 days starting 2 hours after exposure to NM. TED treatment effectively mitigated NM-toxicity to the cornea.
Figure 19:
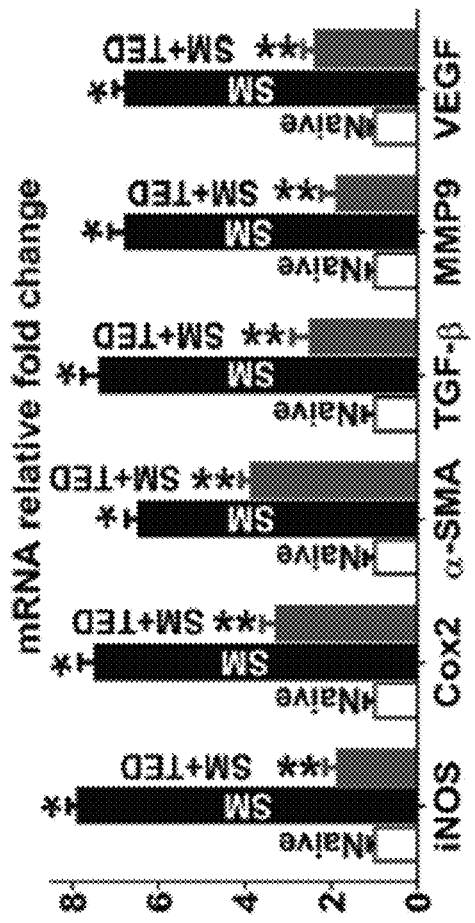
FIG. 19 is a plot of gene expression in normal and NM-treated corneas as measured by quantitative PCR.

Topical TED may modulate multiple pathways involved in wound healing, fibrotic-components, ECM-degradation, and angiogenic pathways to delay MGK onset in vivo (FIG. 17). To examine this, the therapeutic potential of TED against SM toxicity for human patients was first evaluated using an ex vivo corneal organ culture model previously described (Mario T L, Giuliano E A, Sharma A, Mohan R R. Development of a novel ex vivo equine corneal model. Vet Ophthalmol. 2017; 20:288-293). A SM analog (NM; 200 μM) was topically applied onto the central cornea for 30 seconds with a 6-mm filter disc. Then, the disc was removed and cornea was washed with saline (balanced salt solution; B S S), supplemented with fresh media, and incubated in humidified $CO_2$ tissue culture incubator for 2 h. Thereafter, TED was topically applied on the cornea every 8 h for 3 days maintained in ex vivo culture conditions for 3 days. The degree of corneal opacification was studied with stereomicroscope by placing a sheet with text directly beneath cornea. The transparency of naive corneas led to easy visualization of text (FIG. 18A), NM-exposed corneas demonstrated marked opacification as text was not readable (FIG. 18B), and TED remarkably decreased severity of NM-induced corneal opacification and preserved refractive power allowing for easy recognition text on sheet (FIG. 18C). This study highlights therapeutic potential of TED as an effective antidote for SM ocular toxicity.

After imaging, corneal tissues were collected for cellular and molecular studies on day 14. TED mitigates acute MGK by curbing exuberant wound healing via multiple mechanisms. To test this, mRNA levels of a few selected inflammatory, fibrotic and angiogenic factors primarily responsible for stromal wound repair were measured. As evident from FIG. 19. NM-exposed human corneas showed significantly increased mRNA levels of iNOS (immune and inflammatory mediator), COX2 (inflammation and pain regulator), αSMA (myofibroblast marker), TGFβ (wound healing and fibrosis mediator), MMP9 (stromal remodeling via ECM degradation), and VEGF (wound healing and angiogenesis modulator) compared to the vehicle treated controls. TED treatment significantly reduced NM-induced increased mRNA levels of these factors.

Example 11: Effect of TED on Inflammatory, Fibrotic and Angiogenic Pathways

Figures 20, 21:
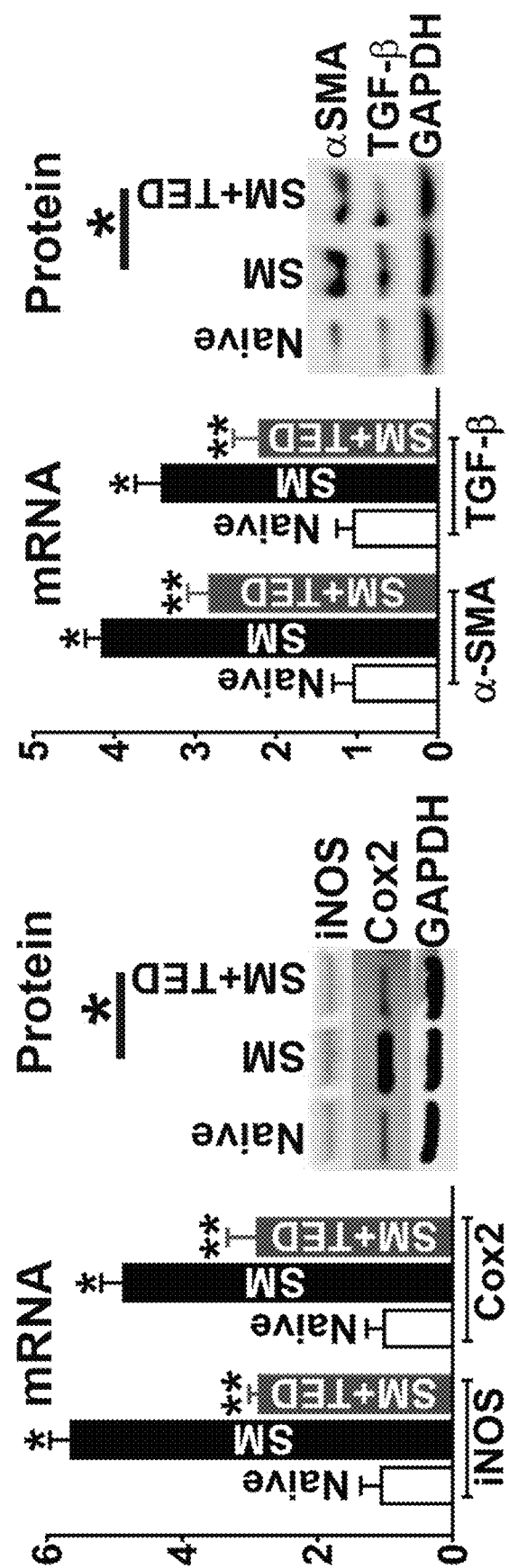
FIG. 20 is a bar graph and western blot showing mRNA and protein expression, respectively, of iNOS and Cox2 in naïve, SM and SM+TED treated corneas. Graphs report expression 90 days after SM exposure and TED treatment.
FIG. 21 is a bar graph and western blot showing mRNA and protein expression, respectively, of αSMA and TGF-β in naïve, SM and SM+TED treated corneas. Levels were measured 90 days after SM exposure and TED treatment.
Figure 23:
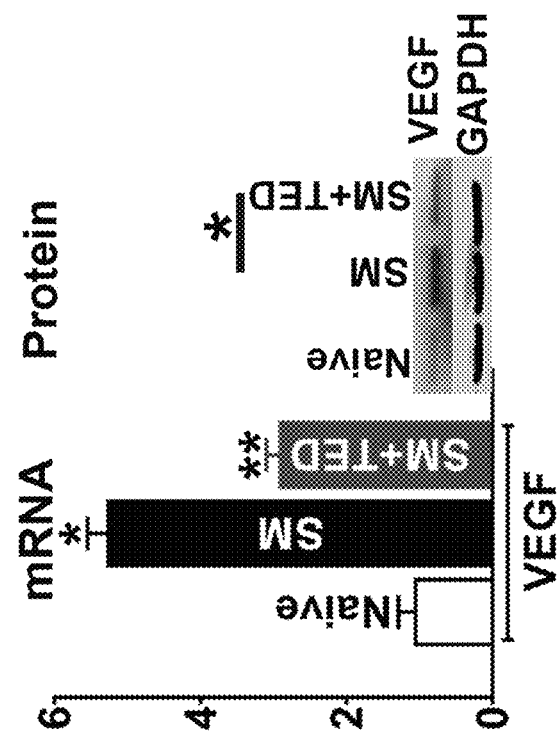
FIG. 23 is a bar graph and western blot showing mRNA and protein expression, respectively, of VEGF in naïve, SM and SM+TED treated corneas. Levels were measured 90 days after SM exposure and TED treatment.
Figure 22:
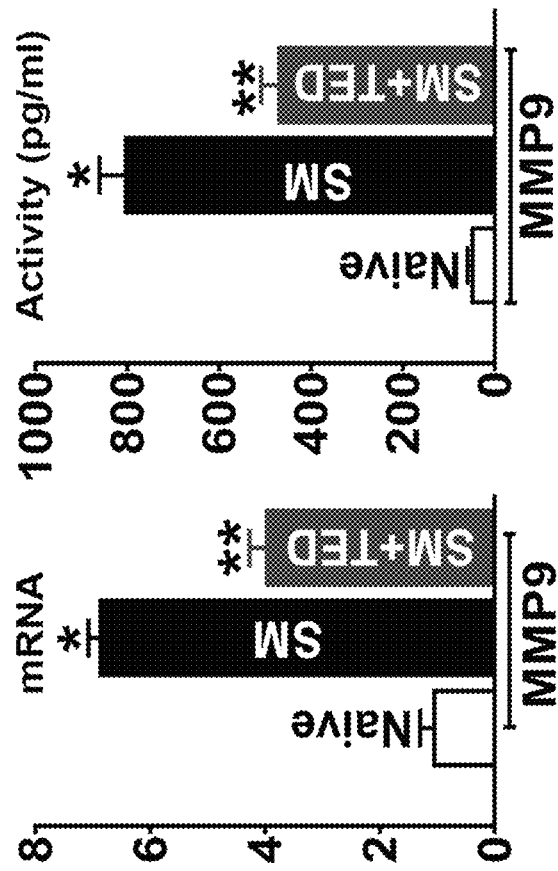
FIG. 22 depicts two bar graphs showing MMP9 mRNA expression and MMP9 activity level in naïve, SM-treated, and SM+TED treated corneas as measured 90 days after SM exposure and TED treatment.

To provide additional evidence that TED mitigates acute MGK by inhibiting primarily inflammatory pathways and delays MGK onset by curbing exuberant wound healing via fibrotic and angiogenic pathways, SM-vapor rabbit in vivo ocular toxicity model was used. In brief, rabbit corneas were exposed to SM at MRI Global and tissues were collected on Day 7 for acute studies and Day 90 for delayed onset studies. Total RNA was extracted from the rabbit corneas, reverse transcribed and qPCR was performed for the inflammatory markers in day 7 and fibrotic and angiogenic markers in day 90 corneas. Similarly, protein lysates of naive-, SM- and SM+TED-treated corneas were prepared and subjected to western blotting to identify changes in iNOS, COX2, αSMA, TGFβ, and VEGF proteins, and commercial kit for MMP9 activity. FIG. 20 showed increased iNOS and COX2 expression at the transcript and protein levels at day 90, which was significantly decreased with the application of TED drops. As evident from FIG. 21, SM-exposure dramatically elevated expression of fibrotic markers such as αSMA and TGFβ in corneas collected at day-90, which were reduced by the TED treatment close to normal levels. Since MMP9 plays vital role in corneal wound repair, we quantified MMP9 enzyme activity in naive, SM-exposed and SM+TED-treated corneas. As apparent from FIG. 22, TED treatment significantly attenuated SM-enhanced MMP9 activity in rabbit cornea of day 90 (delayed MGK). We also investigated mRNA and protein expression of the VEGF in naive, SM-exposed, and SM+TED corneal tissues of 90-day, and found that TED was able to suppress VEGF angiogenic growth factor in SM-exposed corneas of day-90 (FIG. 23). These in vivo proof-of-principle studies strongly support to our hypothesis.

Example 12: Proposed Experiments to Determine Molecular Mechanisms of TED on SM Toxicity Potential parameters for proposed studies to further Potential parameters for a proposed study to further test the effect of topical TED on delayed MGK toxicity: Rabbit tissues of 4 groups (naive, TED-alone, SM-vapor, and SM+TED) from Example 5 acute SM toxicity studies (7- and 14-day) and Example 9 delayed-onset MGK SM toxicity studies (2-, 4-, 8- and 12-month) are intended to be used to examine underlying molecular mechanisms of TED in mitigating SM toxicity. Additionally, to confirm translation of mechanisms in humans, ex vivo human cornea organ culture model and NM-washout protocol may be used, which are available in lab described above in preliminary studies. We may employ suitable negative and positive controls for each experiment while performing the following 6 experiments to validate our mechanistic postulate.

Exp-1 is intended to look at health of corneal epithelial basal cell, basement membrane, and collagen fibril organization using H&E, Masson Trichrome, integrin (34 (epithelial-stromal integrity) and β-tubulin (pain) immunostaining. Exp-2 is intended to quantify inflammatory mediators (Cd11b, F4/80, iNOS, NO, MCP1, Mac1) and NFkB pathway to unveil the mechanism of action of TED in ameliorating the biphasic toxic effects of SM in rabbit cornea in vivo using qPCR, western blots, ELISA, flow cytometry and cellular assay kits. Exp-3 is intended to study the role of TED on delayed-onset SM toxicity in the eye. mRNA and protein levels/activity of MMPs and extracellular matrix components (αSMA, Collagen-I and IV, Fibronectin, Tenascin, TIMPs and MMPs) may be quantified with qPCR, western blotting, zymography and/or double/triple immuno fluorescence staining. Exp-4 is intended to investigate involvement of TGFβ (ERK1/2) and VEGF signaling pathways and caspases to account for the TED responses to SM toxicity by measuring mRNA and protein levels with immuno-blotting or staining. Exp-5 is intended to evaluate effects of TED on SM-induced oxidative stress in rabbit cornea of all 4 groups by gauging total and reduced glutathione, lipid peroxidation and other commercially available kits. Exp-6 is intended to study epigenetic modifications, especially the sirtuins (Sirt1, 2 and 3) caused by the delayed onset of the SM-toxicity and its mitigation by TED eye drops with immuno-blotting or staining.

Anticipated Outcome: We anticipate that in vivo and ex vivo histological and molecular evaluations of corneas in conjunction with clinical exam and imaging in live rabbits may results in a better mechanistic understanding. We expect that TED will arrest SM-induced toxicity in cornea by down regulating COX2, VEGF, iNOS, MMPs, TGFβ, αSMA, and collagens. TED is expected to prevent SM-induced epithelial-stromal separation and loss of basement membrane integrity in the cornea in vivo by inhibiting inflammatory and apoptotic genes. Further, we predict finding mitigation of delayed onset of SM toxicity by TED via epigenetic modification controlling fibrotic and angiogenic factors in corneal repair.

Example 13: Evaluating Synergy of TED Components

To evaluate synergistic effects of TED eye drop components, an established in vitro human cornea fibrosis model will be used. This model uses primary human corneal stromal fibroblasts (hCSFs) generated from healthy human donor corneas purchased from the Saving Sight, Kansas City, MO, USA following a published protocol (Mohan, R. R., Tripathi, R., Sharma, A et al. 2019. Decorin antagonizes corneal fibroblast migration via caveolae-mediated endocytosis of epidermal growth factor receptor. Exp Eye Res. 180: 200-207). Primary hCSFs will be seeded in 60 mm culture dishes ($12.5 \times 10^4$ cells/dish) and grown at 37° C. in a humidified 5% $CO_2$ incubator. After 12 hours of incubation, fibrosis will be initiated by adding TGFβ1 (a known fibrosis-inducer) in culture-medium. Then cells will be treated with ketorolac (NSAID), SAHA (HDAC inhibitor), enalapril (ACE inhibitor) or ascorbic acid (water soluble vitamin C) alone or in combination and grown for 72 hr in incubator. Thereafter, cells will be washed, trypsinized, and mRNA and protein lysates generated using commercial kits. To identify synergism in anti-fibrotic mechanisms for selected drugs, the changes in the mRNA and protein levels of inducible nitric oxide synthase (iNOS; immune and inflammatory mediator), cyclooxygenase-2 (COX-2; inflammation and pain regulator), transforming growth factor-β1 (TGF-β1) and α-smooth muscle actin (α-SMA) (wound healing and fibrosis mediators), matrix metalloproteinase (MMP)-2 and -9 (stromal remodeling via ECM degradation), and vascular endothelial growth factor (VEGF; wound healing and angiogenesis modulator) will be quantified and compared for various treatments of drugs following our published protocols (see e.g., Gronkiewicz K M, Giuliano E A, Sharma A, Mohan R R. Molecular mechanisms of suberoylanilide hydroxamic acid in the inhibition of TGF-01-mediated canine corneal fibrosis. Vet Ophthalmol. 2016; 19(6):480-7; Sharma A, Sinha N R, Mohan R R. Role of 5'TG3'-interacting factors (TGIFs) in Vorinostat (HDAC inhibitor)-mediated Corneal Fibrosis Inhibition. Mol Vis. 2015, 21:974-84; Donnelly K S, Giuliano E A, Sharma A, Mohan R R. Suberoylanilide hydroxamic acid (vorinostat): its role on equine corneal fibrosis and matrix metalloproteinase activity. Vet Ophthalmol. 2014; 17 Suppl 1:61-68; Bosiack A P, Giuliano E A, Gupta R, Mohan R R. Efficacy and safety of suberoylanilide hydroxamic acid (Vorinostat) in the treatment of canine corneal fibrosis. Vet Ophthalmol. 2012 September; 15(5):307-14; Tandon A, Tovey J C K, Waggoner M R, A, Sharma A, Cowden J W, Gibson D J, Liu Y, Schultz G S, Mohan R R. Vorinostat: A potent agent to treat laser-induced corneal haze. J Refract Surg. 2012 April; 28(4):285-290; and Sharma A, Bettis D I, Cowden J W, Mohan R R. Localization of angiotensin converting enzyme in rabbit cornea and its role in controlling corneal angiogenesis in vivo. Mol Vis. 2010 April, 16:720-8.). This analysis will allow for the identification and comparison of each drug present in eye drops on various wound healing and fibrosis factors.

REFERENCES

1. Wattana M, Bey T. Mustard gas or sulfur mustard: an old chemical agent as a new terrorist threat. Prehosp Disaster Med. 2009; 24:19-29.
2. United Nations, General Assembly, Report of the OPCW fact-finding mission in Syria regarding the incident of September 2016 as reported in the note verbale of the Syrian Arab Republic Number 113 dated 29 Nov. 2016, S/2017/400 (5 May 2017), available from https://www.un.org/ga/search/view_doc.asp?symbol=S/2017/400.
3. Papirmeister B, Feister A J, Robinson S I, Ford R D. Medical defense against mustard gas, toxic mechanisms and pharmacologic implications. CRC press; 1991.
4. Geraci M J. Mustard gas: imminent danger or eminent threat? Ann Pharmacother. 2008; 42:237-246.
5. Greenberg M I, Sexton K J, Vearrier D. Sea-dumped chemical weapons: environmental risk, occupational hazard. Clin Toxicol (Phila). 2016; 54:79-91.
6. Smith S L. Toxic legacy: mustard gas in the sea around us. J Law Med Ethics. 2011; 39:34-40.
7. Safarinej ad MR, Moosavi S A, Montazeri B. Ocular injuries caused by mustard gas: diagnosis, treatment, and medical defense. Mil Med. 2001; 166:67-70.
8. Solberg Y, Alcalay M, Belkin M. Ocular injury by mustard gas. Sury Ophthalmol. 1997; 41:461-466.
9. McNutt P, Lyman M, Swartz A, Tuznik K, Kniffin D, Whitten K, Milhorn D, Hamilton T. Architectural and Biochemical Expressions of Mustard Gas Keratopathy: Preclinical Indicators and Pathogenic Mechanisms. PLOS ONE. 2012; 7:e42837.
10. McNutt P, Hamilton T, Nelson M, Adkins A, Swartz A, Lawrence R, Milhorn D. Pathogenesis of acute and delayed corneal lesions after ocular exposure to sulfur mustard vapor. Cornea. 2012; 31:280-290.
11. Milhorn D, Hamilton T, Nelson M, McNutt P. Progression of ocular sulfur mustard injury: development of a model system. Ann N Y Acad Sci. 2010; 1194:72-80.
12. Rowell M, Kehe K, Balszuweit F, Thiermann H. The chronic effects of sulfur mustard exposure. Toxicology. 2009; 263:9-11.
13. Jafarinasab M R, Zarei-Ghanavati S, Kanavi M R, Karimian F, Soroush M R, Javadi M A. Confocal microscopy in chronic and delayed mustard gas keratopathy. Cornea. 2010; 29(8):889-894.
14. McNutt P, Tuznik K, Nelson M, Adkins A, Lyman M, Glotfelty E, Hughes J, Hamilton T. Structural, morphological, and functional correlates of corneal endothelial toxicity following corneal exposure to sulfur mustard vapor. Invest Ophthalmol Vis Sci. 2013; 54:6735-6744.
15. Ghasemi H, Ghazanfari T, Ghassemi-Broumand M, Javadi M A, Babaei M, Soroush M R, Yaraee R, Faghihzadeh S, Poorfarzam S, Owlia P, Naghizadeh M M, Etezad-Razavi M, Jadidi K, Naderia M, Hassan Z M. Long-term ocular consequences of sulfur mustard in seriously eye-injured war veterans. Cutan Ocul Toxicol. 2009; 28:71-77.
16. Kadar T, Horwitz V, Sahar R, Cohen M, Cohen L, Gez R, Tveria L, Gutman H, Buch H, Fishbine E, Brandeis R, Dachir S, Amir A. Delayed loss of corneal epithelial stem cells in a chemical injury model associated with limbal stem cell deficiency in rabbits. Curr Eye Res. 2011; 36:1098-1107.
17. Javadi M A, Jafarinasab M R, Feizi S, Karimian F, Negahban K. Management of mustard gas-induced limbal stem cell deficiency and keratitis. Ophthalmology. 2011; 118:1272-1281.
18. Raj avi Z, Safi S, Javadi M A, Jafarinasab M R, Feizi S, Moghadam M S, Jadidi K, Babaei M, Shirvani A, Baradaran-Rafii A, Mohammad-Rabei H, Ziaei H, Ghassemi-Broumand M, Baher S D, Naderi M, Panahi-Bazaz M, Zarei-Ghanavati S, Hanjani S, Ghasemi H, Salouti R, Pakbin M, Kheiri B. Clinical Practice Guidelines for Prevention, Diagnosis and Management of Early and Delayed-onset Ocular Injuries Due to Mustard Gas Exposure. J Ophthalmic Vis Res. 2017; 12:65-80.
19. Murray V S, Volans G N. Management of injuries due to chemical weapons. BMJ. 1991; 302(6769):129-130.
20. Goldich Y, Barkana Y, Zadok D, Avni I, Berenshtein E, Rosner M, Chevion M. Use of amphoteric rinsing solution for treatment of ocular tissues exposed to nitrogen mustard. Acta Ophthalmol. 2013; 91:e35-40.
21. Anumolu S S, DeSantis A S, Menjoge A R, Hahn R A, Beloni J A, Gordon M K, Sinko P J. Doxycycline loaded poly(ethylene glycol) hydrogels for healing vesicant-induced ocular wounds. Biomaterials. 2010; 31:964-974.
22. Gordon M K, Desantis A, Deshmukh M, Lacey C J, Hahn R A, Beloni J, Anumolo S S, Schlager J J, Gallo M A, Gerecke D R, Heindel N D, Svoboda K K, Babin M C, Sinko P J. Doxycycline hydrogels as a potential therapy for ocular vesicant injury. J Ocul Pharmacol Ther. 2010; 26:407-419.
23. Panahi Y, Rajaee S M, Sahebkar A. Ocular Effects of Sulfur Mustard and Therapeutic Approaches. J Cell Biochem. 2017; 118:3549-3560.
24. Amir A, Turetz J, Chapman S, Fishbeine E, Meshulam J, Sahar R, Liani H, Gilat E, Frishman G, Kadar. Beneficial effects of topical anti-inflammatory drugs against sulfur mustard-induced ocular lesions in rabbits. J Appl Toxicol. 2000; 20 Suppl 1:S109-S114.

25. Kadar T, Dachir S, Cohen L, Sahar R, Fishbine E, Cohen M, Turetz J, Gutman H, Buch H, Brandeis R, Horwitz V, Solomon A, Amir A. Ocular injuries following sulfur mustard exposure—pathological mechanism and potential therapy. Toxicology. 2009; 263:59-69.

26. Goswami D G, Tewari-Singh N, Agarwal R. Corneal toxicity induced by vesicating agents and effective treatment options. Ann N Y Acad Sci. 2016; 1374:193-201.

27. Phulke S, Kaushik S, Kaur S, Pandav S S. Steroid-induced Glaucoma: An Avoidable Irreversible Blindness. J Curr Glaucoma Pract. 2017; 11:67-72.

28. Dachir S, Fishbeine E, Meshulam Y, Sahar R, Chapman S, Amir A, Kadar T. Amelioration of sulfur mustard skin injury following a topical treatment with a mixture of a steroid and a NSAID. J Appl Toxicol. 2004; 24:107-113.

29. Morad Y, Banin E, Averbukh E, Berenshtein E, Obolensky A, Chevion M. Treatment of ocular tissues exposed to nitrogen mustard: beneficial effect of zinc desferrioxamine combined with steroids. Invest Ophthalmol Vis Sci. 2005; 46:1640-1646.

30. Goswami D G, Kant R, Tewari-Singh N, Agarwal R. Efficacy of anti-inflammatory, antibiotic and pleiotropic agents in reversing nitrogen mustard-induced injury in ex vivo cultured rabbit cornea. Toxicol Lett. 2018; 293:127-132.

31. Flach A J, Dolan B J, Donahue M E, Faktorovich E G, Gonzalez G A. Comparative effects of ketorolac 0.5% or diclofenac 0.1% ophthalmic solutions on inflammation after cataract surgery. Ophthalmology. 1998; 105:1775-1779.

32. Lima T B, Ribeiro A P, Concei9ao LF da, Bandana M, Manrique W G, Laus J L. Ketorolac eye drops reduce inflammation and delay re-epithelization in response to corneal alkali burn in rabbits, without affecting iNOS or MMP-9. Arq Bras Oftalmol. 2015; 78:67-72.

33. Narvaez J, Krall P, Tooma T S. Prospective, randomized trial of diclofenac and ketorolac after refractive surgery. J Refract Surg. 2004; 20:76-78.

34. Duvic M, Talpur R, Ni X, Zhang C, Hazarika P, Kelly C, Chiao J H, Reilly J F, Ricker J L, Richon V M, Frankel S R. Phase 2 trial of oral vorinostat (suberoylanilide hydroxamic acid, SAHA) for refractory cutaneous T-cell lymphoma (CTCL). Blood. 2007; 109:31-39.

35. Gronkiewicz K M, Giuliano E A, Sharma A, Mohan R R. Molecular Mechanisms of Suberoylanilide Hydroxamic Acid (SAHA) in the Inhibition of TGF-$\beta$1 Mediated Canine Corneal Fibrosis. Vet Ophthalmol. 2016; 19:480-487.

36. Sharma A, Bettis D I, Cowden J W, Mohan R R. Localization of angiotensin converting enzyme in rabbit cornea and its role in controlling corneal angiogenesis in vivo. Mol Vis. 2010; 16:720-728.

37. Loftsson T, Thorisd6ttir S, Fridriksd6ttir H, Stefansson E. Enalaprilat and enalapril maleate eyedrops lower intraocular pressure in rabbits. Acta Ophthalmologica. 2010; 88:337-341.

38. Kasetsuwan N, Wu F M, Hsieh F, Sanchez D, McDonnell P J. Effect of topical ascorbic acid on free radical tissue damage and inflammatory cell influx in the cornea after excimer laser corneal surgery. Arch Ophthalmol. 1999; 117:649-652.

39. Chen J, Lan J, Liu D, Backman L J, Zhang W, Zhou Q, Danielson P. Ascorbic Acid Promotes the Stemness of Corneal Epithelial Stem/Progenitor Cells and Accelerates Epithelial Wound Healing in the Cornea. Stem Cells Transl Med. 2017; 6:1356-1365.

40. Brubaker R F, Bourne W M, Bachman L A, McLaren J W. Ascorbic acid content of human corneal epithelium. Invest Ophthalmol Vis Sci. 2000; 41:1681-1683.

41. Lee M Y, Chung S K. Treatment of corneal neovascularization by topical application of ascorbic acid in the rabbit model. Cornea. 2012; 31:1165-1169.

42. Marlo T L, Giuliano E A, Sharma A, Mohan R R. Development of a novel ex vivo equine corneal model. Vet Ophthalmol. 2017; 20:288-293.

43. Tripathi R, Giuliano E A, Gafen H B, Gupta S, Martin L M, Sinha P R, Rodier J T, Fink M K, Hesemann N P, Chaurasia S S, Mohan R R. Is sex a biological variable in corneal wound healing? Exp Eye Res. 2019; 187:107705.

44. Gouveia R M, Lepert G, Gupta S, Mohan R R, Paterson C, Connon C J. Assessment of corneal substrate biomechanics and its effect on epithelial stem cell maintenance and differentiation. Nat Commun. 2019; 10:1496.

45. Mohan R R, Tripathi R, Sharma A, Sinha P R, Giuliano E A, Hesemann N P, Chaurasia S S. Decorin antagonizes corneal fibroblast migration via caveolae-mediated endocytosis of epidermal growth factor receptor. Exp Eye Res. 2019; 180:200-207.

46. Gupta S, Fink M K, Ghosh A, Tripathi R, Sinha P R, Sharma A, Hesemann N P, Chaurasia S S, Giuliano E A, Mohan R R. Novel Combination BMP7 and HGF Gene Therapy Instigates Selective Myofibroblast Apoptosis and Reduces Corneal Haze In Vivo. Invest Ophthalmol Vis Sci. 2018; 59:1045-1057.

47. Anumanthan G, Gupta S, Fink M K, Tripathi R, Hesemann N P, Bowles D K, McDaniel L M, Muhammad M, Mohan R R. KCa3.1 ion channel: a novel therapeutic target for corneal fibrosis. PLoS One. 2018; 13: e0192145.

48. Lim R R, Tan A, Liu Y C, Barathi V A, Mohan R R, Mehta J S, Chaurasia S S. ITF2357 transactivates Id3 and regulate TGF$\beta$/B1VIP7 signaling pathways to attenuate corneal fibrosis. Sci Rep. 2016; 6:20841.

49. Chaurasia S S, Lim R R, Parikh B H, Yeo S W, Tun B B, Wong T Y, Luu C D, Agrawal R, Ghosh A, Mortellaro A, Rackoczy E, Mohan R R, Barathi V A. The NLRP3 inflammasome may contribute to pathologic neovascularization in the advanced stages of diabetic retinopathy. Sci. Reports 2018; 8:2847.

50. Wilson S E, Mohan R R, Mohan R R, Ambr6sio R, Hong J, Lee J. The corneal wound healing response: cytokine-mediated interaction of the epithelium, stroma, and inflammatory cells. Prog Retin Eye Res. 2001; 20:625-637.

51. Tandon A, Tovey J C K, Sharma A, Gupta R, Mohan R R. Role of transforming growth factor beta in corneal function, biology and pathology. Curr Mol Med. 2010; 10:565-578.

52. Wilson S E, Liu J J, Mohan R R. Stromal-epithelial interactions in the cornea. Prog Retin Eye Res. 1999; 18:293-309.

53. Vij N, Sharma A, Thakkar M, Sinha S, Mohan R R. PDGF-driven proliferation, migration, and IL8 chemokine secretion in human corneal fibroblasts involve JAK2-STAT3 signaling pathway. Mol Vis. 2008; 14:1020-1027.

54. Stapleton W M, Chaurasia S S, Medeiros F W, Mohan R R, Sinha S, Wilson S E. Topical interleukin-1 receptor antagonist inhibits inflammatory cell infiltration into the cornea. Exp Eye Res. 2008; 86:753-757.

55. Wilson S E, Mohan R R, Netto M, Perez V, Possin D, Huang J, Kwon R, Alekseev A, Rodriguez-Perez J P. RANK, RANKL, OPG, and M-CSF Expression in Stromal Cells during Corneal Wound Healing. Invest Ophthalmol Vis Sci. 2004; 45:2201-2211.

56. Mohan R R, Hutcheon A E K, Choi R, Hong J-W, Lee J-S, Mohan R R, Ambrósio R, Zieske J D, Wilson S E: Apoptosis, necrosis, proliferation, and myofibroblast generation in the stroma following LASIK and PRK. Exp Eye Res 2003:76:71-87.

57. Gronkiewicz K, Giuliano E A, Kuroki K, Bunyak F, Sharma A, Teixeira L B, Hamm C W, Mohan R R. Development of a novel in vivo corneal fibrosis model in the dog. Exp Eye Res. 2016; 143:75-88.

58. Netto M V, Mohan R R, Sinha S, Sharma A, Dupps W, Wilson S E. Stromal haze, myofibroblasts, and surface irregularity after PRK. Exp Eye Res. 2006; 82:788-797.

59. Sharma A, Anumanthan G, Reyes M, Chen H, Brubaker J W, Siddiqui S, Gupta S, Rieger F G, Mohan R R. Epigenetic Modification Prevents Excessive Wound Healing and Scar Formation After Glaucoma Filtration Surgery. Invest Ophthalmol Vis Sci. 2016; 57:3381-3389.

60. Anumanthan G, Sharma A, Waggoner M, Hamm C W, Gupta S, Hesemann N P, Mohan R R. Efficacy and Safety Comparison Between Suberoylanilide Hydroxamic Acid and Mitomycin C in Reducing the Risk of Corneal Haze After P R K Treatment In Vivo. J Refract Surg. 2017; 33:834-839.

61. Gupta S, Rodier J T, Sharma A, Giuliano E A, Sinha P R, Hesemann N P, Ghosh A, Mohan R R. Targeted AAV5-Smad7 gene therapy inhibits corneal scarring in vivo. PLoS One. 2017; 12:e0172928.

62. Sharma A, Mehan M M, Sinha S, Cowden J W, Mohan R R. Trichostatin a inhibits corneal haze in vitro and in vivo. Invest Ophthalmol Vis Sci. 2009; 50:2695-2701.

63. Tandon A, Tovey J C K, Waggoner M R, Sharma A, Cowden J W, Gibson D J, Liu Y, Schultz G S, Mohan R R. Vorinostat: A Potent Agent to Prevent and Treat Laser-induced Corneal Haze. J Refract Surg. 2012; 28:285-290.

64. Sharma A, Sinha N R, Siddiqui S, Mohan R R. Role of 5'TG3'-interacting factors (TGIFs) in Vorinostat (HDAC inhibitor)-mediated Corneal Fibrosis Inhibition. Mol Vis. 2015; 21:974-984.

65. Li X, Zhou Q, Hanus J, Anderson C, Zhang H, Dellinger M, Brekken R, Wang S. Inhibition of multiple pathogenic pathways by histone deacetylase inhibitor SAHA in a corneal alkali-burn injury model. Mol Pharm. 2013; 10:307-318.

66. Kitano A, Okada Y, Yamanka O, Shirai K, Mohan R R, Saika S. Therapeutic potential of Trichostatin A to control inflammatory and fibrogenic disorders of the ocular surface. Mol Vis. 2010; 16:2964-2973.

67. Shoeibi N, Mousavi M N, Balali-Mood M, Moshiri M, Darchini-Maragheh E, Mousavi S R, Abrishami M. Long-term complications of sulfur mustard poisoning: retinal electrophysiological assessment in 40 severely intoxicated Iranian veterans. International Journal of Retina and Vitreous. 2017; 3:7.

68. Banin E, Morad Y, Berenshtein E, Obolensky A, Yahalom C, Goldich J, Adibelli F M, Zuniga G, DeAnda M, Pe'er J, Chevion M. Injury induced by chemical warfare agents: characterization and treatment of ocular tissues exposed to nitrogen mustard. Invest Ophthalmol Vis Sci. 2003; 44:2966-2972.

69. Pfister R R, Haddox J L, Lank K M. Citrate or ascorbate/citrate treatment of established corneal ulcers in the alkali-injured rabbit eye. Invest Ophthalmol Vis Sci. 1988; 29:1110-1115.

70. Levinson R A, Paterson C A, Pfister R R. Ascorbic acid prevents corneal ulceration and perforation following experimental alkali burns. Invest Ophthalmol. 1976; 15:986-993.

71. Gunby P. Vitamin C may enhance healing of caustic corneal burns. JAMA. 1980; 243:623.

72. Pfister R R, Paterson C A, Hayes S A. Effects of topical 10% ascorbate solution on established corneal ulcers after severe alkali burns. Invest Ophthalmol Vis Sci. 1982; 22:382-385.

73. Javadi M A, Yazdani S, Sajjadi H, Jadidi K, Karimian F, Einollahi B, Ja'farinasab MR, Zare M. Chronic and delayed-onset mustard gas keratitis: report of 48 patients and review of literature. Ophthalmology. 2005; 112:617-625.

74. Goswami D G, Tewari-Singh N, Dhar D, Kumar D, Agarwal C, Ammar D A, Kant R, Enzenauer R W, Petrash J M, Agarwal R. Nitrogen mustard-induced corneal injury involves DNA damage and pathways related to inflammation, epithelial-stromal separation and neovascularization. Cornea. 2016; 35:257-266.

75. Charkoftaki G, Jester J V, Thompson D C, Vasiliou V. Nitrogen mustard-induced corneal injury involves the sphingomyelin-ceramide pathway. Ocul Surf. 2018; 16:154-162.

76. DeSantis-Rodrigues A, Chang Y-C, A. Hahn R, P. Po I, Zhou P, Lacey C J, Pillai A, Young S C, Flowers II R A, Gallo M A, Laskin J D, Gereck D R, Svoboda K K H, Heindel N D, Gordon M K. ADAM17 Inhibitors Attenuate Corneal Epithelial Detachment Induced by Mustard Exposure. Invest Ophthalmol Vis Sci. 2016; 57:1687-1698.

77. Bourne W M. Biology of the corneal endothelium in health and disease. Eye. 2003; 17:912-918.

78. Bonanno J A. "Molecular Mechanisms Underlying the Corneal Endothelial Pump." Exp Eye Res. 2012; 95:2-7.

79. Feizi S. Corneal endothelial cell dysfunction: etiologies and management. Therapeutic Advances in Ophthalmology. 2018; 10:251584141881580.

80. Xeroudaki M, Peebo B, Germundsson J, Fagerholm P, Lagali N. RGTA in corneal wound healing after transepithelial laser ablation in a rabbit model: a randomized, blinded, placebo-controlled study. Acta Ophthalmologica. 2016; 94:685-691.

81. He J, Cortina M S, Kakazu A, Bazan H E P. The PEDF Neuroprotective Domain Plus DHA Induces Corneal Nerve Regeneration After Experimental Surgery. Invest Ophthalmol Vis Sci. 2015; 56:3505-3513.

82. He J, Cosby R, Hill J M, Bazan H E P. Changes in Corneal Innervation after HSV-1 Latency Established with Different Reactivation Phenotypes. Curr Eye Res. 2017; 42:181-186.

83. Khateri S, Ghanei M, Keshavarz S, Soroush M, Haines D. Incidence of lung, eye, and skin lesions as late complications in 34,000 Iranians with wartime exposure to mustard agent. J Occup Environ Med. 2003; 45:1136-1143.

84. Ljubimov A V, Saghizadeh M. Progress in corneal wound healing. Progress in Retinal and Eye Research. 2015; 49:17-45.

85. Mohan, R. R., Tripathi, R., Sharma, A et al. 2019. Decorin antagonizes corneal fibroblast migration via caveolae-mediated endocytosis of epidermal growth factor receptor. Exp Eye Res. 180: 200-207.

86. Gronkiewicz K M, Giuliano E A, Sharma A, Mohan R R. Molecular mechanisms of suberoylanilide hydroxamic acid in the inhibition of TGF-01-mediated canine corneal fibrosis. Vet Ophthalmol. 2016; 19(6):480-7.
87. Sharma A, Sinha N R, Mohan R R. Role of 5' TG3'-interacting factors (TGIFs) in Vorinostat (HDAC inhibitor)-mediated Corneal Fibrosis Inhibition. Mol Vis. 2015; 21:974-84.
88. Donnelly K S, Giuliano E A, Sharma A, Mohan R R. Suberoylanilide hydroxamic acid (vorinostat): its role on equine corneal fibrosis and matrix metalloproteinase activity. Vet Ophthalmol. 2014; 17 Suppl 1:61-68.
89. Bosiack A P, Giuliano E A, Gupta R, Mohan R R. Efficacy and safety of suberoylanilide hydroxamic acid (Vorinostat) in the treatment of canine corneal fibrosis. Vet Ophthalmol. 2012 September; 15(5):307-14.
90. Tandon A, Tovey J C K, Waggoner M R, A, Sharma A, Cowden J W, Gibson D J, Liu Y, Schultz G S, Mohan R R. Vorinostat: A potent agent to treat laser-induced corneal haze. J Refract Surg. 2012 April; 28(4):285-290.
91. Sharma A, Bettis D I, Cowden J W, Mohan R R. Localization of angiotensin converting enzyme in rabbit cornea and its role in controlling corneal angiogenesis in vivo. Mol Vis. 2010 April; 16:720-8.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

The invention claimed is:

1. A method of treating corneal damage, ocular toxicity, or a combination thereof in a subject in need thereof, the method comprising administering to an eye of the subject a composition comprising:
    (a) a nonsteroidal anti-inflammatory drug (NSAID);
    (b) a histone deacetylase (HDAC) inhibitor; and
    (c) an angiotensin converting enzyme (ACE) inhibitor, wherein the ACE inhibitor is selected from enalapril, benazepril, captopril, fosinopril, lisinopril, moexipril, perindopril, quinapril, ramipril, trandolapril, or a combination thereof, and
    wherein the cornea damage or ocular toxicity is induced by exposure to a chemical agent.
2. The method of claim 1, wherein the composition comprises from about 0.1% to about 5% of the NSAID.
3. The method of claim 1, wherein the composition comprises from about 1 µM to about 50 µM of the HDAC inhibitor.
4. The method of claim 3, wherein the composition comprises from about 20 µM to about 30 µM of the HDAC inhibitor.
5. The method of claim 1, wherein the composition comprises from about 1 µM to about 50 µM of the ACE inhibitor.
6. The method of claim 1, wherein the NSAID is selected from diclofenac sodium, flubiprofen sodium, ketorolac, bromfenac, nepafenac, or a combination thereof.
7. The method of claim 1, wherein the NSAID comprises ketorolac.
8. The method of claim 1, wherein the HDAC inhibitor is selected from vorinostat (suberoylanilide hydroxamic acid, SAHA), trichostatin A (TSA), panobinostat (LBH589), belinostat (PXD101), romidepsin (FK228), entinostat (MS-275), mocetinostat (MGCD0103), valproic acid (VPA), sodium butyrate (NaB), phenylbutyrate (PBA), or a combination thereof.
9. The method of claim 1, wherein the HDAC inhibitor inhibits Class I and Class II HDACs.
10. The method of claim 1, wherein the HDAC inhibitor comprises suberoylanilide hydroxamic acid (SAHA).
11. The method of claim 1, wherein the ACE inhibitor comprises enalapril.
12. The method of claim 1, wherein the composition further comprises a water-soluble vitamin.
13. The method of claim 12, wherein the composition comprises from about 1% to about 20% of the water-soluble vitamin.
14. The method of claim 12, wherein the water-soluble vitamin comprises Vitamin C (ascorbic acid).
15. The method of claim 1, wherein the composition inhibits a cyclooxygenase-2 (COX2), a matrix metallopeptidase (MMP), an inducible nitric oxide synthase (iNOS), myofibroblast formation, neovascularization, or a combination of any thereof.
16. The method of claim 1, wherein the composition comprises about 0.5 wt. % or vol. % of ketorolac, about 25 µM of suberoylanilide hydroxamic acid (SAHA), about 25 µM of enalapril, and about 10 wt. % of ascorbic acid.
17. The method of claim 1, wherein the composition further comprises a pharmaceutically appropriate carrier.
18. The method of claim 1, wherein the chemical agent comprises sulfur mustard gas.
19. The method of claim 18, wherein intraocular pressure is reduced upon administration of the composition to the eye of the subject.

* * * * *